United States Patent
Sundar et al.

(10) Patent No.: US 11,360,942 B2
(45) Date of Patent: Jun. 14, 2022

(54) METHODS, DEVICES AND SYSTEMS FOR MAINTAINING CONSISTENCY OF METADATA AND DATA ACROSS DATA CENTERS

(71) Applicant: WANdisco, Inc., San Ramon, CA (US)

(72) Inventors: Jagane Sundar, Saratoga, CA (US); Michal Dobisek, Prague (CZ); Yeturu Aahlad, Foster City, CA (US); Mark McKeown, Belfast (IE)

(73) Assignee: WANdisco Inc., San Ramon, CA (US)

( * ) Notice: Subject to any disclaimer, the term of this patent is extended or adjusted under 35 U.S.C. 154(b) by 832 days.

(21) Appl. No.: 15/457,837

(22) Filed: Mar. 13, 2017

(65) Prior Publication Data

US 2018/0260409 A1    Sep. 13, 2018

(51) Int. Cl.
*G06F 16/00* (2019.01)
*G06F 16/178* (2019.01)
(Continued)

(52) U.S. Cl.
CPC ............ *G06F 16/178* (2019.01); *G06F 16/13* (2019.01); *G06F 16/148* (2019.01);
(Continued)

(58) Field of Classification Search
CPC .......... G06F 16/13; G06F 3/067; G06F 3/065; G06F 16/178; G06F 3/0619;
(Continued)

(56) References Cited

U.S. PATENT DOCUMENTS 5,261,085 A    11/1993    Lamport
5,699,515 A    12/1997    Berkema et al.
(Continued)

FOREIGN PATENT DOCUMENTS

CN    102999633 A    3/2013
CN    103458044 A    12/2013
(Continued)

OTHER PUBLICATIONS

Examination Report No. 1 for standard patent application dated Dec. 6, 2016 in AU patent application 2013368487.
(Continued)

*Primary Examiner* — Yicun Wu
(74) *Attorney, Agent, or Firm* — Young Law Firm, P.C.

(57) ABSTRACT

A computer-implemented method may comprise providing a first executed agreement cache in a first data center and a second executed agreement cache in a second data center; receiving agreements on proposals to create or make changes to files stored in the first and second data centers; storing metadata of the files referred to by the received agreements the first and/or second executed agreement caches; maintaining the first and second executed agreement caches synchronous with one another before the files referred to by the received agreements are created or changed; creating or making changes to the file referred to by the received agreements only after the first and second executed agreement caches have been synchronized; and searching the first and/or second executed agreement caches for updated metadata whenever requests for data of files stored in the first or second data centers are received in the first or the second data centers and, responsive to the received requests, providing data corresponding to the updated metadata when updated metadata is found.

18 Claims, 8 Drawing Sheets

(51) Int. Cl.
  *G06F 16/13* (2019.01)
  *G06F 16/23* (2019.01)
  *G06F 16/172* (2019.01)
  *G06F 16/182* (2019.01)
  *G06F 16/14* (2019.01)
  *G06F 17/30* (2006.01)

(52) U.S. Cl.
  CPC ........ *G06F 16/172* (2019.01); *G06F 16/1844* (2019.01); *G06F 16/2365* (2019.01)

(58) Field of Classification Search
  CPC ............... G06F 3/0689; G06F 11/1448; G06F 11/1458; G06F 16/128; G06F 16/134; G06F 16/1774; G06F 2201/84; G06F 12/1036; G06F 12/109; G06F 12/145; G06F 13/37; G06F 16/148; G06F 16/18; G06F 3/0605; G06F 3/0611; G06F 3/0643; G06F 3/0644; G06F 3/0659; G06F 3/0665; G06F 3/0667; G06F 3/0673; G06F 16/22; G06F 16/285; G06F 16/9535; G06F 16/182; G06F 3/0647; G06F 16/215; G06F 16/27; G06F 16/9024; G06F 2201/805; G06F 11/1451; G06F 11/1456; G06F 11/1469; G06F 11/2094; G06F 16/24534; G06F 16/24544; G06F 16/319; G06F 16/58; G06F 16/5838; G06F 16/5854; G06F 16/951; G06F 2201/82; G06F 11/00; G06F 16/183; G06F 16/1844; G06F 16/219; G06F 16/2228; G06F 16/2329; G06F 16/2358; G06F 16/24; G06F 16/24564; G06F 16/313; G06F 16/328; G06F 16/84; G06F 16/93; G06F 8/60; G06F 17/277; G06F 21/6218; G06F 11/1088; G06F 16/119; G06F 16/24578; G06F 16/248; G06F 16/95; G06F 2009/45583; G06F 3/0608; G06F 9/445; G06F 9/45558; G06F 11/1076; G06F 11/1666; G06F 11/2097; G06F 16/122; G06F 16/156; G06F 16/164; G06F 16/166; G06F 16/1734; G06F 16/1805; G06F 16/1827; G06F 16/1873; G06F 16/214; G06F 16/23; G06F 16/273; G06F 16/275; G06F 16/288; G06F 2201/855; G06F 3/064; G06F 9/45504; G06F 9/5016; G06F 9/5083; G06F 9/52; G06F 9/542; G06F 9/544; G06F 11/1092; G06F 11/1464; G06F 12/0253; G06F 16/10; G06F 16/16; G06F 16/172; G06F 16/184; G06F 16/211; G06F 16/2264; G06F 16/2365; G06F 2211/104; G06F 2211/1088; G06F 2212/154; G06F 2212/261; G06F 3/0616; G06F 3/062; G06F 3/0623; G06F 3/0641; G06F 3/0661; G06F 3/0674; G06F 9/38; G06F 9/44505; G06F 9/45533; G06F 9/5005; G06F 9/5066

See application file for complete search history.

(56) References Cited

U.S. PATENT DOCUMENTS

| | | |
|---|---|---|
| 5,737,601 A | 4/1998 | Jain et al. |
| 5,781,910 A | 7/1998 | Gostanian et al. |
| 6,014,669 A | 1/2000 | Slaughter et al. |
| 6,161,146 A | 12/2000 | Kley et al. |
| 6,202,067 B1 | 3/2001 | Blood et al. |
| 6,247,059 B1 | 6/2001 | Johnson |
| 6,261,085 B1 | 7/2001 | Steger et al. |
| 6,360,366 B1 | 3/2002 | Heath et al. |
| 6,401,120 B1 | 6/2002 | Gamache et al. |
| 6,898,642 B2 | 5/2005 | Chafle et al. |
| 7,069,320 B1 | 6/2006 | Chang |
| 7,155,524 B1 | 12/2006 | Reiter et al. |
| 7,167,900 B2 | 1/2007 | Berkowitz et al. |
| 7,185,076 B1 | 2/2007 | Novaes |
| 7,334,154 B2 | 2/2008 | Lorch et al. |
| 7,400,596 B1 | 6/2008 | Robertson et al. |
| 7,558,883 B1 | 7/2009 | Lamport |
| 7,765,186 B1 | 7/2010 | Hu et al. |
| 7,788,522 B1 | 8/2010 | Abdelaziz |
| 8,180,747 B2 | 5/2012 | Marinkovic |
| 8,732,648 B2 | 5/2014 | Suaya |
| 8,818,951 B1 | 8/2014 | Muntz |
| 9,009,215 B2 | 4/2015 | Aahlad et al. |
| 9,020,987 B1 | 4/2015 | Nanda et al. |
| 9,130,943 B1 | 9/2015 | Giardina |
| 9,158,843 B1 | 10/2015 | Florissi et al. |
| 2002/0129087 A1 | 9/2002 | Cachin et al. |
| 2003/0131262 A1 | 7/2003 | Goddard |
| 2003/0145020 A1 | 7/2003 | Ngo et al. |
| 2004/0034822 A1 | 2/2004 | Marchand |
| 2004/0111441 A1 | 6/2004 | Saito |
| 2004/0172421 A1 | 9/2004 | Saito |
| 2004/0221149 A1 | 11/2004 | Rao et al. |
| 2005/0086384 A1 | 4/2005 | Ernst |
| 2005/0198493 A1 | 9/2005 | Bartas |
| 2005/0253644 A1 | 12/2005 | Lorch et al. |
| 2006/0013252 A1 | 1/2006 | Smith |
| 2006/0143517 A1 | 7/2006 | Douceur et al. |
| 2006/0155720 A1 | 7/2006 | Aahlad et al. |
| 2006/0155729 A1 | 7/2006 | Aahlad et al. |
| 2006/0203837 A1 | 9/2006 | Shvodian |
| 2006/0235889 A1 | 10/2006 | Rousseau et al. |
| 2006/0253856 A1 | 11/2006 | Hu |
| 2006/0259818 A1 | 11/2006 | Howell et al. |
| 2007/0189249 A1 | 8/2007 | Gurevich |
| 2007/0204078 A1 | 8/2007 | Boccon-Gibod |
| 2008/0036472 A1 | 2/2008 | Collins et al. |
| 2008/0133741 A1 | 6/2008 | Kubota |
| 2008/0134052 A1 | 6/2008 | Davis et al. |
| 2009/0150566 A1 | 6/2009 | Malkhi et al. |
| 2009/0210431 A1 | 8/2009 | Marinkovic |
| 2010/0070982 A1* | 3/2010 | Pitts .................. G06F 16/1734 719/318 |
| 2010/0153282 A1 | 6/2010 | Graham |
| 2010/0018014 A1 | 7/2010 | Rousseau et al. |
| 2010/0180146 A1 | 7/2010 | Rousseau et al. |
| 2010/0188969 A1 | 7/2010 | Kim |
| 2010/0192160 A1 | 7/2010 | Taylor et al. |
| 2010/0333166 A1 | 12/2010 | Herrod |
| 2011/0066296 A1 | 3/2011 | Nelson |
| 2011/0072062 A1 | 3/2011 | Guarraci |
| 2011/0107358 A1 | 5/2011 | Shyam |
| 2011/0302449 A1 | 12/2011 | Douceur et al. |
| 2011/0314163 A1 | 12/2011 | Borins |
| 2011/0320403 A1* | 12/2011 | O'Krafka .............. G06F 16/273 707/620 |
| 2012/0101991 A1 | 4/2012 | Srivas et al. |
| 2012/0197958 A1 | 8/2012 | Nightingale |
| 2012/0204139 A1 | 8/2012 | Suaya et al. |
| 2012/0254412 A1 | 10/2012 | Goose et al. |
| 2012/0311003 A1 | 12/2012 | Kuznetsov |
| 2013/0198332 A1 | 8/2013 | Van Ackere |
| 2014/0019495 A1 | 1/2014 | Borthakur |
| 2014/0059310 A1 | 2/2014 | Du et al. |
| 2014/0074996 A1 | 3/2014 | Bortnikov et al. |
| 2014/0082145 A1 | 3/2014 | Lacapra |
| 2014/0164262 A1 | 6/2014 | Graham |
| 2014/0181262 A1 | 6/2014 | Goswami et al. |
| 2014/0344323 A1 | 11/2014 | Pelavin |
| 2015/0067002 A1 | 3/2015 | Shvachko et al. |
| 2015/0180963 A1* | 6/2015 | Luecke .................. H04L 67/327 709/203 |

(56) References Cited

U.S. PATENT DOCUMENTS

| | | | |
|---|---|---|---|
| 2016/0275125 | A1 | 9/2016 | Drobychev et al. |
| 2017/0277453 | A1* | 9/2017 | Huang .................... G06F 3/067 |
| 2019/0258529 | A1* | 8/2019 | Moldvai ............... G06F 9/5016 |

FOREIGN PATENT DOCUMENTS

| | | |
|---|---|---|
| CN | 103458044 A1 | 12/2013 |
| JP | 2017-500670 A | 1/2017 |
| WO | 2015/153045 A1 | 10/2015 |

OTHER PUBLICATIONS

Examination Report No. 1 for standard patent application dated Dec. 6, 2016 in AU patent application 2013368486.
USPTO Notice of Allowance dated Jun. 21, 2016 in U.S. Appl. No. 14/041,894.
USPTO Office Action dated Jul. 27, 2016 in U.S. Appl. No. 14/231,311.
Extended European Search Report dated Jul. 14, 2016 in EP application 13869434.4.
Extended European Search Report dated Jul. 7, 2016 in EP application 13867648.1.
USPTO Notice of Allowance dated Aug. 3, 2016 in U.S. Appl. No. 15/004,144.
Canadian Patent Office Office Action dated Jan. 15, 2018 in Canadian patent application 2,922,665.
European Patent Office Communication pursuant to Article 94(3) EPC dated Jan. 25, 2018 in EPO patent application serial No. 13867648.1.
USPTO Office Action dated Jan. 26, 2018 in U.S. Appl. No. 15/276,455.
USPTO Office Action dated Feb. 10, 2017 in U.S. Appl. No. 14/815,787.
USPTO Office Action dated Mar. 9, 2017 in U.S. Appl. No. 15/149,850.
Extended European Search Report in EP application 14769597.7, dated Nov. 16, 2016.
Examination report No. 1 for standard patent application in AU application 2013368486, dated Dec. 6, 2016.
Examination report No. 1 for standard patent application in AU application 2013368487, dated Dec. 6, 2016.
Konstantin Shvachko et al. "The Hadoop Distributed File System", Mass Storage Systems and Technologies (MSST), 2010 IEEE 26th Symposium on, IEEE, Piscataway, NJ, USA, May 3, 2010, pp. 1-10, XP031698650, ISBN 978-1-4244-7152-s.
Extended European Search Report dated Jul. 17, 2017 in EPO Application 15773935.0.
International Search Report and Written Opinion in PCT/US13/63422, dated Apr. 21, 2014.
International Search Report and Written Opinion in PCT/US14/10451.
Nternational Search Report and Written Opinion in PCT/US13/63454, dated Apr. 18, 2014.
Office Action dated Dec. 19, 2014 in U.S. Appl. No. 13/837,366.
Notice of Allowance dated Jan. 1, 2105 in U.S. Appl. No. 13/838,639.
USPTO Office Action dated Feb. 5, 2015 in related U.S. Appl. No. 13/835,888.
USPTO Office Action dated May 22, 2015 in related U.S. Appl. No. 14/013,948.
International Preliminary Report on Patentability dated Jul. 9, 2015 in PCT application PCT/US2013/063422.
International Preliminary Report on Patentability dated Jul. 9, 2015 in PCT application PCT/US2013/063454.
International Search Report and Written Opinion dated Jun. 25, 2015 in PCT application PCT/US2015/18680.
USPTO Notice of Allowance dated Jul. 30, 2015 in U.S. Appl. No. 14/464,030.
SPTO Office Action dated Sep. 24, 2015 in U.S. Appl. No. 14/013,948.
Wiki Amazon S3, downloaded from http://en.wikipedia.org/wiki/Amazon_S3 on Mar. 4, 2014.
Introducing Geo-replication for Windows Azure Storage, Sep. 15, 2011 1:27 PM, downloaded from http://blogs.msdn.com/b/windowsazurestorage/archive/2011/09/15/introducing-geo-replication-for-windows-azure-storage.aspx on Mar. 4, 2014.
Google Cloud Storage Overview, downloaded from https://developers.google.com/storage/docs/overview on Mar. 4, 2014.
Cloudera Backup and Disaster Recovery, downloaded from https://www.cloudera.com/content/cloudera-content/cloudera-docs/CM4Ent/latest/Cloudera-Backup-Disaster-Recovery/Cloudera-Backup-Data-Recovery.html on Mar. 4, 2014.
What is Hadoop? » Apache Falcon Apache Falcon A framework for managing data processing in Hadoop Clusters, downloaded from http://hortonworks.com/hadoop/falcon/ on Mar. 4, 2014.
MapR Disaster Recovery Scenario Data+Protection, Peter Conrad, last edited by Anne Leeper on Feb 22, 2014, downloaded from http://doc.mapr.com/display/MapR/Data+Protection#DataProtection-Disaster-RecoveryScenario: DisasterRecovery on Mar. 4, 2014.
Hadoop HDFS HDFS-5442 Zero loss HDFS data replication for multiple datacenters, The Apache Software Foundation , Created: Oct. 29, 2013 13:11 Updated:Jan. 10, 2014 08:13, doownloaded from https://issues.apache.org/jira/browse/HDFS-5442 on Mar. 4, 2014.
Disaster Recovery Solution for Apache Hadoop Contributors: Chen Haifeng (haifeng.chen@intel.com), Gangumalla Uma (uma.gangumalla@intel.com), Dey Avik (avik.dey@intel.com), Li Tianyou (tianyou.li@intel.com), Purtell, Andrew (andrew.k.purtell@intel.com), downlaoded from https://issues.apache.org/jira/secure/attachment/12620116/Disaster%20Recovery%20Solution%20for%20Hadoop.pdf on Mar. 4, 2014.
Spanner: Google's Globally-Distributed Database, James C. Corbett, Jeffrey Dean, Michael Epstein, Andrew Fikes, Christopher Frost, JJ Furman, Sanjay Ghemawat, Andrey Gubarev, Christopher Heiser, Peter Hochschild, Wilson Hsieh, Sebastian Kanthak, Eugene Kogan, Hongyi Li, Alexander Lloyd, Sergey Melnik, David Mwaura, David Nagle, Sean Quinlan, Rajesh Rao, Lindsay Rolig, Yasushi Saito, Michal Szymaniak, Christopher Taylor, Ruth Wang, and Dale Woodford, downloaded from http://research.google.com/archive/spanner.html on Mar. 4, 2014.
Transactional storage for geo-replicated systems Yair Sovran, Russell Power, Marcos K. Aguilera, Jinyang Li, downloaded from http://research.microsoft.com/en-us/people/aguilera/walter-sosp2011.pdf on Mar. 4, 2014.
Stronger Semantics for Low-Latency Geo-Replicated Storage, Wyatt Lloyd, Michael J. Freedman, Michael Kaminsky, and David G. Andersen, to appear in Proceedings of the 10th USENIX Symposium on Networked Systems Design and Implementation (NSDI'13), Lombard, IL, Apr. 2013, downlaoded from http://sns.cs.princeton.edu/docs/eiger-nsdi13.pdf on Mar. 4, 2014.
CSPAN: Cost-Effective Geo-Replicated Storage Spanning Multiple Cloud Services, Zhe Wu, Michael Butkiewicz, Dorian Perkins, Ethan Katz-Bassett, Harsha V. Madhyastha, downlaoded from http://conferences.sigcomm.org/sigcomm/2013/papers/sigcomm/p545.pdf on Mar. 4, 2014.
USPTO Office Action dated May 18, 2017 in U.S. Appl. No. 12/069,986.
Geo-replication, downloaded from http://searchwindowsserver.techtarget.com/definition/geo-replication on Mar. 4, 2014.
Amazon Simple Storage Service Developer Guide API Version Mar. 1, 2006, downloaded from http://awsdocs.s3.amazonaws.com/S3/latest/s3-dg.pdf on Mar. 4, 2014.
USPTO Office Action dated Sep. 15, 2016 in U.S. Appl. No. 12/069,986.
International Search Report and Written Opinion dated May 24, 2018 in PCT/US2018/22062.
USPTO Office Action dated Jan. 26, 2018 in U.S. Appl. No. 15/071,447.
Implementing Fault-Tolerant Services Using the State Machine Approach: A Tutorial, Fred B. Schneider Department of Computer Science, Cornell University, Ithaca, New York 14853, ACM Computing Surveys, vol. 22, No. 4, Dec. 1990.

(56) References Cited

OTHER PUBLICATIONS

Specifying Systems, The TLA+Language and Tools for Hardware and Software Engineers Leslie Lamport, Microsoft Research, First Printing, Version of Jun. 18, 2002, ISBN 0-321-14306-X.
The Part-Time Parliament, Leslie Lamport, ACM Transactions on Computer Systems 16, (May 2, 1998), 133-169.
Time, Clocks, and the Ordering of Events in a Distributed System, Leslie Lamport, Massachusetts Computer Associates, Inc., Communications of the ACM, Jul. 1978, vol. 21, No. 7.
Paxos Made Simple, Leslie Lamport, Nov. 1, 2001.
Oki et al. "Viewstamped Replication: A new Primary Copy Method to Support Highly-Available Distributed Systems", Technical Paper submitted at ACM Symposium . . . , 1998, pp. 8-17.
Bernstein et al., "Concurrency Control & Recovery in Database Systems", published by Addison Wesley, 1987, Chapters 6, 7 and 8.
Eli Collins, Todd Lipcon, Aaron T Myers, HDFS High Availability.
Sanjay Radia, Rob Chansler, Suresh Srinivas, High Availability Framework for the HDFS Namenode.
Sanjay Radia, Suresh Srinivas, Yahoo! Inc. High Availability for the HDFS Namenode.
Todd Lipcon, Quorum-Journal Design, Oct. 3, 2012.
Extended European Search Report dated Aug. 20, 2020 om EP Application 18767539.2.
Alexander Thomson Google+ AGT©Google Com Daniel J Abadi Yale University DNA@CS Yale Edu: 11 CalvinFS: Consistent WAN Replication and Scalable Metadata Management for Distributed File Systems 11 USENIX, USENIX, The Advanced Computing Systems Association • Feb. 16, 2015 (Feb. 16, 2015), pp. 8-21, XP061024680, Retrieved from the Internet: URL:https://www.usenix.org/sites/default/files/fast15 full proceedings interior.pdf [retrieved on Feb. 16, 2015]—Sections 2-7.
English translation of JPO Office Action dated Sep. 7, 2021 in Japanese Application 2019-545967.
Examination Report from the Indian Patent Office dated Sep. 15, 2021 in IN patent application 201937030994.
EPO Examination Report dated Feb. 21, 2022 in EP18767539.2 (4 pages).

* cited by examiner

METHODS, DEVICES AND SYSTEMS FOR MAINTAINING CONSISTENCY OF METADATA AND DATA ACROSS DATA CENTERS

BACKGROUND

The field of the embodiments disclosed herein includes distributed file systems. In particular, embodiments are drawn to methods, devices and systems for maintaining consistency of replicated file folders in a distributed file system over a Wide Area Network (WAN) that may include, for example, the Internet.

DETAILED DESCRIPTION

Figure 1:
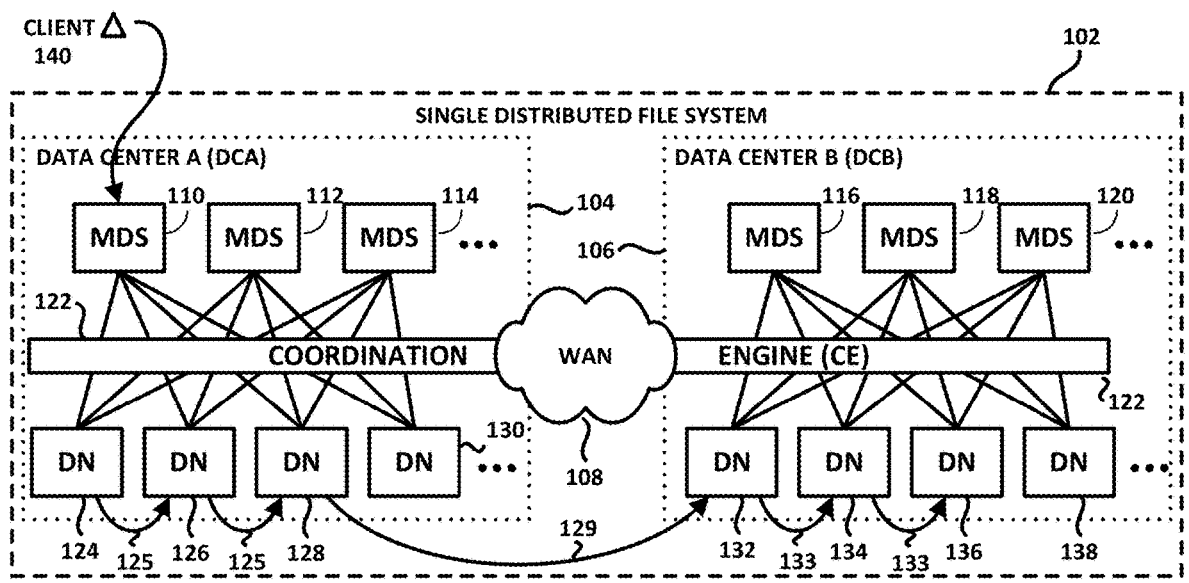
FIG. 1 is a diagram of a distributed file system implementation suitable for implementation of methods, devices and systems according to embodiments.

The Hadoop-Compatible File System (HCFS) namespace is a hierarchy of files and directories. Hadoop is an open source, Java-based programming framework that supports the processing and storage of extremely large data sets in a distributed computing environment. It is part of the Apache project sponsored by the Apache Software Foundation. Files and directories are represented on the NameNode by Inodes. Inodes record attributes such as permissions, modification and access times, namespace and disk space quotas. The file content is split into large data blocks (typically 128 MB), and each data block of the file is independently replicated at multiple DataNodes (typically three). One implementation of HCFS is the Hadoop Distributed File System (HDFS). The NameNode is the metadata service of HDFS, which is responsible for namespace operations. The NameNode maintains the namespace tree and the mapping of blocks to DataNodes. That is, the NameNode tracks the location of data within a Hadoop cluster and coordinates client access thereto. Conventionally, each cluster has a single NameNode. The cluster can have thousands of DataNodes and tens of thousands of HDFS clients per cluster, as each DataNode may execute multiple application tasks concurrently. The Inodes and the list of data blocks that define the metadata of the name system are called the image. NameNode keeps the entire namespace image in Random Access Memory (RAM).

To maintain system consistency between nodes of a distributed file system, it may become necessary to coordinate various distributed events between the nodes. The simplest way to coordinate a particular event that must be learned consistently by all nodes is to choose a designated single master and record that event on the master so that other nodes may learn of the event from the master. Although simple, this approach lacks reliability, as failure of the single master stalls the progress of the entire system. In recognition of this, conventional HDFS implementations use an Active NameNode that is accessed during normal operations and a backup called the Standby NameNode that is used as a failover in case of failure of the Active NameNode. This, however, is believed to be a sub-optimal solution. For example, in this scheme, the transaction journal(s) itself becomes the single point of failure. Indeed, upon corruption of the transaction journal(s), the Standby NameNode can no longer assume the same state as the Active NameNode and failover from the active to the Standby NameNode is no longer possible.

Moreover, in Hadoop solutions that support only one active NameNode per cluster, standby servers, as noted above, are typically kept in sync via Network Attached Storage (NAS) devices. If the active NameNode fails and the standby must take over, there is a possibility of data loss if a change written to the Active NameNode has yet to be written to the NAS. Administrator error during failover can lead to further data loss. Moreover, if a network failure occurs in which the active server cannot communicate with the standby server but can communicate with the other machines in the cluster, and the standby server mistakenly assumes that the active server is dead and takes over the active role, then a pathological network condition known as a "split-brain" can occur, in which two nodes believe that they are the Active NameNode, which condition can lead to data corruption.

The roles of proposers (processes who make proposals to change the state of the namespace to the membership), acceptors (processes who vote on whether a proposal to change the state of the namespace should be agreed by the membership) and learners (processes in the membership who learn of agreements that have been made) are defined in, for example, the implementation of the Paxos algorithm described in Lamport, L.: The Part-Time Parliament, ACM Transactions on Computer Systems 16, 2 (May 1998), 133-169, which is incorporated herein in its entirety. According to one embodiment, multiple nodes may be configured to carry out each of the roles. A Coordination Engine may allow multiple learners to agree on the order of events submitted to the engine by multiple proposers with the aid of multiple acceptors to achieve high availability. To achieve reliability, availability, and scalability, multiple simultaneously active NameNodes (which may be thought of, generically, as metadata servers) may be provided by replicating the state of the namespace on multiple nodes with the requirement that the state of the nodes on which the namespace is replicated remains consistent between such nodes.

This consistency between NameNodes may be guaranteed by the Coordination Engine, which may be configured to accept proposals to update the namespace, streamline the proposals into a global sequence of updates and only then allow the NameNodes to learn and apply the updates to their individual states in the agreed-upon order. Herein, "consistency" means One-Copy Equivalence, as detailed in Bernstein et al., "Concurrency Control & Recovery in Database Systems", published by Addison Wesley, 1987, Chapters 6, 7 & 8, which is hereby incorporated herein in its entirety. Since the NameNodes start from the same state and apply the same deterministic updates in the same deterministic order, their respective states are and remain consistent.

According to one embodiment, therefore, the namespace may be replicated on multiple NameNodes (or, more generally, metadata servers) provided that a) each node is allowed to modify its namespace replica, and
b) updates to one namespace replica must be propagated to the namespace replicas on other nodes such that the namespace replicas remain consistent with one another, across nodes.

FIG. 1 is a diagram of a distributed file system according to one embodiment that finds particular utility in the WAN environment. FIG. 1 also illustrates aspects of replication methods, applicable over a WAN, for a distributed, HCFS (such as, for example, HDFS) based on a Replicated State Machine model. According to one embodiment, NameNodes are located in different geographically distributed data centers. Such data centers may be located, for example, on different continents. Described herein are embodiments that are applicable to a distributed file system that span, for example, an HCFS cluster over a WAN that includes, for example, the Internet and/or a private or proprietary WAN.

Architecture Overview

FIG. 1 is a block diagram of components of a cluster and a distributed file system that spans a WAN, according to one embodiment. As shown therein, the (e.g., single) cluster running a distributed file system 102 according to one embodiment, may comprise two or more data centers; namely, Data Center A (DCA) 104 and Data Center B (DCB) 106. DCA 104 and DCB 106 may be geographically remote from one another. For example, DCA 104 and DCB 106 may be located in different parts of a single country, may be distributed on different continents, different time zones and may draw from wholly independent electrical grids. DCA 104 and DCB 106 may be loosely coupled to one another via a WAN 108 that may include, for example, the Internet and/or other private and/or proprietary networks. DCA 104 and DCB 106 may also be coupled via other dedicated, high speed connections. Although only two data centers 104, 106 are shown in FIG. 1, it is to be understood that embodiments may include a greater number of data centers and that the distributed file system 102 extends across all such data centers.

As shown, DCA 104 may comprise a plurality of active (as opposed to, for example, Standby or Failover) metadata servers (of which a Hadoop NameNode is but one possible implementation) denoted figures as "MDS". In this manner, DCA 104 may comprise MDSs denoted by reference numerals 110, 112 and 114 and DCB 106 may comprise MDSs denoted by reference numerals 116, 118 and 120. Each of the MDS 110, 112, 114, 116, 118 and 120 may be configured to store the state of the namespace of the distributed file system and to maintain that single namespace in a consistent manner across MDSs and data centers. Aspects of the coordination between MDSs and the maintenance of the single namespace across MDSs may be provided by distributed Coordination Engine (CE) process 122. In FIG. 1, the CE process 122 is shown in a manner that suggests it to be a separate logical entity spanning DCA 104, DCB 106 and the WAN 108. According to one embodiment, however, the functionality of the CE 122, described above and hereunder, may be discharged by each of the MDSs 110, 112, 114, 116, 118 and 120. That is, each of the MDSs 110, 112, 114, 116, 118 and 120 may be configured, among its other functions, to carry out some or all of the duties of the CE 122.

The DCA 102 may comprise a plurality of DataNodes 124, 126, 128, 130, referenced as "DN" in FIG. 1. Similarly, DCB 104 may also comprise a plurality of DataNodes 132, 134, 136, 138, also referenced as "DN" in FIG. 1. As shown, each of the DataNodes 124, 126, 128, 130 may be coupled to and configured to communicate with each of the MDSs 110, 112 and 114 of DCA 102. As also shown, each of the DataNodes 132, 134, 136, 138 may be coupled to and configured to communicate with each of the MDS 116, 118 and 120 of DCB 106. According to one embodiment, the MDSs may not communicate directly with the DataNodes. Indeed, according to one embodiment, the DataNodes may be configured to send requests to the MDSs, whereupon the MDSs issue commands to the DataNodes responsive to the received requests. Therefore, although the MDSs may be said to control the DataNodes, the DataNodes may be configured, according to one embodiment, to send requests to the MDSs in order to receive a command therefrom. Four DataNodes 124, 126, 128, 130 are shown in DCA 104. Similarly, four DataNodes 132, 134, 136 and 138 are shown in DCB 106. It is to be understood, however, that that data centers 104 and 106 may each comprise many more (e.g., thousands) data nodes than are shown in FIG. 1.

Although three MDSs 110, 112, 114 are shown as being provided within DCA 102, a greater number of MDSs may be provided within DCA 102. Similarly, although three MDSs 116, 118, 120 are shown as being provided within DCB 106, a greater number of MDSs may be provided within DCB 106. According to one embodiment, the number of MDSs within a data center may be selected to be an odd number.

According to one embodiment, FIG. 1 shows a cluster running a single distributed file system spanning different geographically-separated data centers. The distributed file system may, for example, incorporate aspects of HDFS. Each of the DataNodes may be configured to communicate (through DataNode-to-NameNode remote procedure call (RPC) protocol) only with MDSs within their own data center. Conversely, the MDSs of a data center may be configured to control only the DataNodes within their own data center. That is, the DataNodes of data center 104 may only, according to one embodiment, communicate with the MDSs of their own data center 104 and the Data nodes of data center 106 may only communicate with the MDSs of their own data center 106. The MDSs of both data centers 102, 104 coordinate with each other to maintain the state of the namespace consistent through the coordination engine 122. Data nodes of one data center may communicate with data nodes of the other data center or data centers.

According to one embodiment, the CE process 122 may be configured to guarantee that the same deterministic updates to the state of the namespace are applied in the same deterministic order on all MDSs. According to one embodiment, that deterministic order is defined by Global Sequence Number (GSN). Therefore, a significant role of the CE process 122, according to one embodiment, is to process the proposals to modify or otherwise update the state of the namespace from all MDSs and transform them into a globally-ordered sequence of agreements. The MDSs may then sequentially apply the agreements from that ordered sequence as updates to their stored state. According to one embodiment, the GSN may be configured as a unique monotonically increasing number. However, the GSN may be otherwise configured, as those of skill in this art may recognize. The GSN may then be used to compare the progress of different MDSs in updating the state of the namespace and keeping that namespace state consistent across MDSs (or bringing the state of the namespace stored in each of the MDS into consistency over time through the sequential application of the globally ordered sequence of agreements). For example, if MDS 110 has just processed an agreement numbered GSN1, which is smaller than GSN2 just processed by MDS 112, then MDS 110 has an earlier namespace state than does MDS 112. The state of the namespace stored by MDS 110 will match that stored by MDS 112 as soon as MDS 110 processes GSN2, provided that MDS 112 has not processed a higher-numbered agreement in the interim. In this manner and through the sequential execution of the ordered (though the GSN mechanism) set of agreements generated by the CE process 122, the state of the namespace stored in each of the MDSs in each of the data centers is brought to or maintained in consistency.

According to one embodiment, with each operation, clients learn about the latest GSN processed on the MDS to which the client is currently connected. Thereafter, if the client switches to another MDS it should, according to one embodiment, first wait (if necessary) until the new MDS catches up with the last GSN the client knows about (i.e., the GSN that the client received from the previously-accessed MDS) before issuing an RPC comprising a data access command such as a write. This will avoid the stale read problem. As MDSs start from the same state, this ordered application of updates implies consistency of the replicas, in that snapshots thereof taken on different nodes having processed the agreements at the same GSN are identical, both within and across data centers.

One embodiment coordinates all metadata between MDSs 110, 112, 114, 116, 118, 120 instantaneously (or nearly so, accounting for bandwidth and latencies inherent in the network), as the CE process 122 delivers the agreements. Likewise, all file system data is also automatically replicated across the multiple data centers of the cluster. One embodiment provides consistent, continuous data replication between file systems in (e.g., but not limited to, Hadoop) clusters. Client applications may be configured to interact with a virtual file system that integrates the underlying storage across multiple clusters. When changes are made to files in one cluster, those changes are replicated consistently to the other spanned clusters. One embodiment may comprise a software application that allows Hadoop deployments to replicate HCFS data between (e.g., Hadoop) clusters that are running different, even incompatible versions of Hadoop such as, for example, CDH, HDP, EMC Isilon, Amazon S3/EMRFS and MapR. It is also possible, according to one implementation, to replicate between different vendor distributions and versions of Hadoop.

Advantageously, embodiments provide a virtual file system for Hadoop, compatible with all Hadoop applications, a single, virtual namespace that integrates storage from different types of Hadoop, a globally-distributed storage mechanism, and WAN replication using active-active replication technology, delivering single-copy consistent HDFS data, replicated between far-flung data centers.

According to one embodiment, some or all of the functionality described herein may be carried out within a server or servers adjacent to the Hadoop cluster away from, for example, the active MDS s and Coordination Engine, at a higher level in the Hadoop stack. In this manner, rather than working deeply at the namenode level, one embodiment may be configured to operate as a proxy application to the Hadoop file system.

Embodiments may be configured to boost processing power in the cloud by transferring data to remote cloud services such as, for example, Amazon Web Services (AWS) a platform that offers on-demand compute power, database storage, content delivery and other functionality, to gain additional processing power when it's required.

In addition, embodiments enable the synchronization across different Hadoop distributions, such as the ability to replicate, for example, between two Hortonworks clusters, between Hortonworks and Cloudera and EMC's Isilon storage systems, to name but a few of the possibilities. Synchronization with HBase servers may also be accommodated. Hbase is an open source, non-relational, distributed database modeled after Google's BigTable and is written in Java. Hbase was developed as part of Apache Software Foundation's Apache Hadoop project and runs on top of HDFS, providing BigTable-like capabilities for Hadoop.

Figure 2:
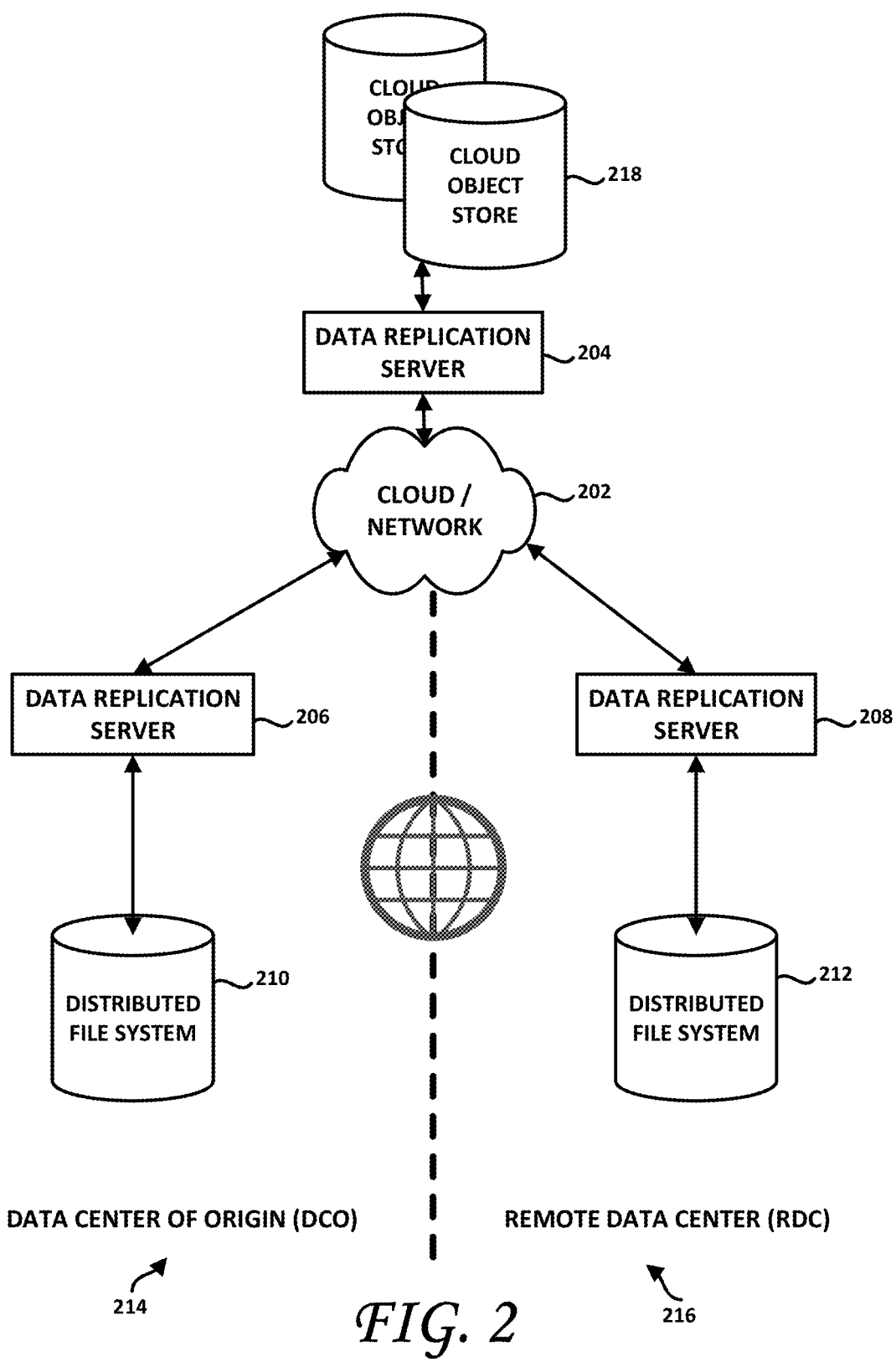
FIG. 2 is a diagram of a local and a remote data center coupled to a computer network.

One embodiment replicates metadata operations (e.g. create file) synchronously using a Paxos agreement that is agreed to, over a computer network 202, by a majority quorum of data replication servers 204, 206, 208, as shown in FIG. 2. As shown, the computer network 202 may span multiple locations across the world connected by WAN (Wide Area Network) links. Data operations (e.g. write file data) that may be associated with the metadata operation are replicated asynchronously with no co-ordination, often after the metadata operations. That is, the writes to the distributed file systems storages 210, 212 and 218 associated with a create file metadata operation may be carried out asynchronously, without coordination amongst the plurality of data replication servers 204, 206, 208. This is to ensure that storage performance at the data center of origin (DCO) 214 is not negatively impacted while the remote data center (RDC) is replicating the data written to the distributed file system storage 210 in the DCO 214 to the distributed file storage 212 in the RDC 216. However, these uncoordinated data write operations open up a window during which subsequent metadata operations on the same file object may cause such uncoordinated data copy operations to fail. For example, the filename or path could be changed while one of the uncoordinated data write operations was being carried out, which would cause failure of the data write operation.

An illustrative example of such a problem is the case in which a client of a DCO 214 creates a file, say "foo.tmp", writes 200 MB of data to the file, closes it and, thereafter, renames the "foo.tmp" file to "foo". Data replication server(s) in the RDC(s) 216 will see the metadata for the file create operation for "foo.tmp", but while it or they are copying the 200 MB of data, the data replication server in the DCO may execute the "rename foo.tmp to foo" agreement, thus causing the replication of the "foo.tmp" data to the RDC to fail, as it is pulling the 200 MB of data from a file "foo.tmp" that no longer exists where it is pulling from.

One implementation restarts the pull of the data from the DCO 214 to the RDC 216 when a file is renamed while the data of the file is being pulled asynchronously. Indeed, the data pull, which was initiated at File close, fails because of the intervening file rename operation. To overcome this, the rename operation checks to see if the file is inconsistent, and if inconsistent, restarts the pull with the rename destination as the DCO source of the data for the pull.

Another embodiment, more advantageously, tracks metadata changes across data centers to prevent data replication failures after an operation such as a file rename or a change to the path to the file whose data is to be replicated. The present disclosure describes embodiments of such a synchronous metadata and asynchronous data replication system.

Design Principles

Relative to its deployment on a big data replication platform, one embodiment may be configured to embody the following three design principles:

1. No data is to be stored or cached in any of the computing components described hereunder including, without limitation, clients, the data replication servers or the version bridging servers. Indeed, one embodiment may be implemented by caching the metadata operations of the agreed-upon proposals, and not the data associated with such operations.
2. The remote datacenter clients (the datacenter clients of the RDC 216 where the data is to be replicated, as opposed to the data center clients of the DCO 214 where the data was originally written) will see a view of the metadata that is consistent at the point in time of the underlying storage, using the mechanism of the GSN. That is, the namespace across clusters and the state of a replicated folder will be identical at the same GSN, across data centers. Data however, may be incomplete. In other words, remote clients may see the existence of a file (as the metadata thereof will have been cached synchronously), but the underlying data thereof may not have been fully written yet. This behavior mimics the behavior of slow writers with eager readers in a single data center instance of the big data storage system.
3. RDC clients will never see data that does not belong to the point in time for that file system, nor will they see a mix of data from different points in time of the file, as developed further below.

Verifying the Correctness of the Disclosed Embodiments

The simplest way to prove correctness is to abort any data pull (i.e., pulling data from the DCO to the RDC) if a change is made to the same path in a subsequent metadata operation. The file is marked as inconsistent, and repair is performed to correct the inconsistency. This check can be performed with minimal knowledge of the replication service, i.e. knowledge of the filesystem semantics of the underlying store. It can also be implemented with minimal caching of executed agreements.

Design

A naïve implementation that would satisfy just the correctness criteria listed immediately above would result in many abort and repair operations, rendering the replicated folder inconsistent and degrading the efficiency of the distributed system. Hence, embodiments described herein provide optimizations that are based upon the filesystem semantics of the underlying storage system.

According to one embodiment, failure of a data pull operation at either the DCO 214 or the RDC 216 may result in the operation being re-initiated using a name mapping service. Indeed, a data pull operation from the DCO 214 to the RDC 216 requires both a read operation at the DCO 214 and a write operation at the RDC 216. If either fails, the operations are retried using a name mapping service Application Program Interface (API), also denoted herein as MapFilename. These optimizations and the deployment of name mapping service, according to one embodiment, require more detailed information to be stored about the filesystem operations performed at each agreement.

According to one embodiment, the enhancements may comprise three aspects:

1. Enhancements to the data replication server 206, 208 (FIG. 2), 308, 310 (FIG. 3) to cache executed agreements in an executed agreement cache 309, 311, and to implement the MapFilename API using this executed agreement cache 309, 311;
2. The deployment of a version bridging server 312 to call name mapping service MapFilename on the source filename at the DCO 214; and
3. Enhancement to the data replication server 310 to call the name mapping service on the target filename at the RDC 216 and corresponding deployment of a version bridging server 314 to call the name mapping service on the source filename at the RDC 216.

Figure 3:
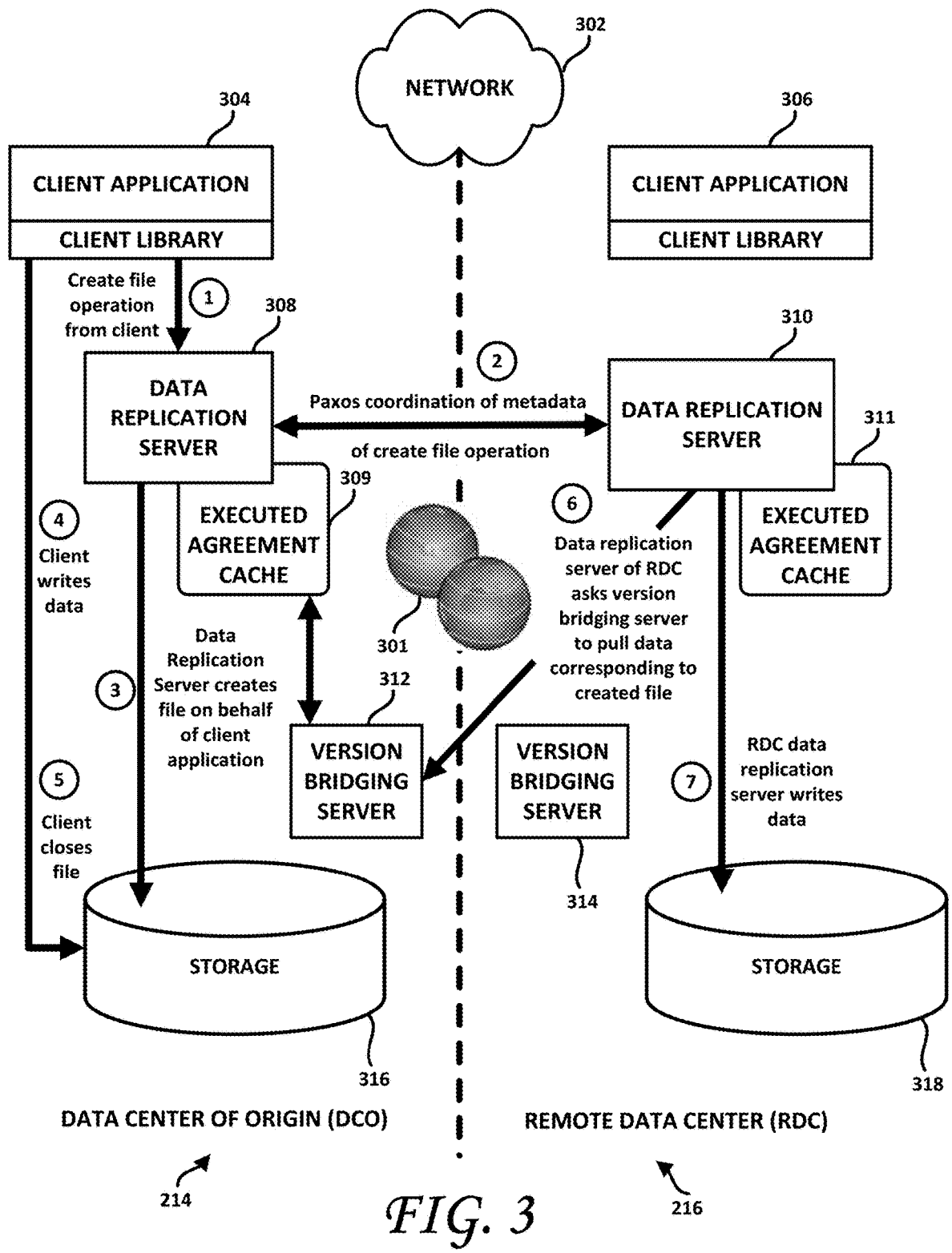
FIG. 3 is a diagram showing data centers coupled to a computer network and aspects of computer-implemented systems and methods, according to embodiments.

FIG. 3 is a block diagram illustrating aspects of computer-implemented methods and systems, according to one embodiment. As shown, reference numeral 214 denotes the DCO and numeral 216 denotes the RDC, although the nomenclatures could be swapped. The DCO 214 and the RDC 216 may be loosely coupled via one or more computer networks 302 and may be geographically separated, as suggested by the globes 301. In the DCO 214, a client application 304 may utilize a client library to issue data access commands to a data replication server 308. Similarly, in the RDC 216, a client application 306 may utilize a client library to issue data access commands to a data replication server 310. The data replication server 308, according to one embodiment, caches the metadata of agreements to change the state of the replicated folder and the associated GNSs of the agreements in a cache 309 (shown in FIG. 3 as Executed Agreement Cache 309) and the data replication server 310 caches also caches the metadata of agreements, and associated GSNs in a cache 311. The caches 309, 311 are maintained consistent with one another, as described below. One embodiment provides for a version bridging server 312 in the DCO 214 and a version bridging server 314 in the RDC 216. Finally, each of the DCO 214 and the RDC 216 includes storage, as shown at 316, 318, which storages are configured to persistently store the data corresponding to the metadata cached in the executed agreement caches 309, 311.

Create-GSN

A file to be replicated, according to one embodiment, may be identified by a unique Create-GSN. The Create-GSN is the unique GSN that is contemporaneously assigned to and associated with the agreement for the creation of the file. Incidentally, this ensures that embodiments are seamlessly interoperable with storage systems such as S3, which do not have the HFlush feature.

The Executed Agreement Caches

The Data replication server 308 may be configured, according to one embodiment, to cache executed agreements in an executed agreement cache 309 and the data replication server 310 may be configured, according to one embodiment, to cache executed agreements in an executed agreement cache 311. According to one embodiment, the data replication servers 308, 310 may be configured to implement the name mapping service MapFilename API on entries in the executed agreement cache 309, 311, respectively. Since agreements may be executed out of order, the data replication servers 308, 310 may be configured with the ability to iterate and search through all GSNs higher than a specified GSN.

With continued reference to FIG. 3, client application 304 may issue a Create File proposal, to which the coordination engine may issue a corresponding agreement. The client application 304 may then issue a Create File operation to the data replication server 308, as shown at (1). To provide a comprehensive solution that works not only when there is no change to the file name, path or data from creation, writing, initiation of the pull operation to the end of the data write at the remote data center, but also when an intervening change occurs, the following method may be performed. Significantly and according to one embodiment, the metadata associated with the file create operation may be cached in the executed agreement cache 308 at the DCO 214 and immediately (e.g., quickly) synchronized over the network 302 with the data replication server 310 in the RDC 216, to update the data replication server's executed agreement cache 311, as shown at (2). This makes the file creation operation visible to the RDC 216, maintaining a single view of the replicated folder across data centers 214, 216. According to one embodiment, there may be one executed agreement cache for each replicated folder. Other implementations are possible and a single physical cache may be logically partitioned to accommodate the metadata of several replicated folders. As the metadata consists of a relatively small amount of data, sending it across the wire from the executed agreement cache 309 in the DCO 214 to the to the executed agreement cache 311 in the RDC 216 a fast operation, at least when compared with the time required to replicate the corresponding file data from the storage 316 in the DCO 214 to the storage 318 in the RDC 216. The aim is to quickly coordinate file write operations using generated GSNs across executed agreement caches 309, 311 (and others, if present) and thereafter allow the underlying data itself to be replicated asynchronously (and often comparatively slower), without coordination. In this manner, the writer of the data (in the example being developed herein, the client application 304) does not incur any significant penalties (in term of latency or network bandwidth limitations, for example), as it creates a file and writes to the underlying local storage 316.

As shown at (3), after the coordinated replication of the create file operation metadata, the data replication server 308 may create the file in the storage 316 on behalf of the client application, at a specified fully-qualified path and filename. That information may then be passed back to the client application 304, which may then write data to that filename (may be at relatively-higher Local Area Network (LAN) speeds) as shown at (4). The client application 304 may then, when finished writing the data, close the file as shown at (5).

Because the data replication server 310 at the RDC 216 now "knows about" the created file (because it now stores the metadata thereof in its executed agreement cache 311), it queries the version bridging server 312 of the DCO 214. The data replication server 310 may provide the version bridging server 312 with the Create-GSN associated with the created file, which Create-GSN forms part of the metadata obtained from the DCO's data replication server 308 at (2). The version bridging server 312 may then cause the data replication server 308 of the DCO 214 to execute the name mapping service on the entries in the executed agreement cache 309, which may then step through subsequent GSNs (subsequent to the Create-GSN) in the executed agreement cache 309, to determine whether any changes to the file's filename, path and/or data have subsequently occurred since (i.e., at higher GSNs than) the Create-GSN provided to it by the RDC's data replication server 310. Note that those changes to the file's file name, path and/or data would have been proposed, agreed upon and the metadata thereof stored in the executed agreement cache 309 at the DCO 214 and replicated, under coordination, in the data replication server 310's executed agreement cache 311 in the interim.

The version bridging server 312 of the DCO 214 may then provide any updated filename, path and data to the data replication server 310 at the RDC 216. The data replication server 310 may then write the data thus obtained to the proper filename, path in the storage 318. Of course, a client application at the RDC 216 may have carried out some state altering operation on the file before, during or after the replication of data. Each of these eventualities are covered herein below.

According to one implementation, the following information may be cached for each agreement executed by the data replication servers 308, 310:

1. Executed agreement cacheEntry.Operation. This is an identification of the file operation such as rename, delete, truncate, append or repair;
2. Executed agreement cacheEntry.Path1, with the following constraints:
   a. The path must be fully qualified path (as opposed to a relative path) of a directory or file; and
   b. No wildcards allowed (*, $, etc.);
   c. In case of a rename operation, this Executed agreement cacheEntry.Path1 is the source path;
3. Executed agreement cacheEntry.Path2, with the following constraints:
   a. Fully qualified destination path of a directory or file;
   b. No wildcards allowed; and
   c. Present only in the case of rename;
4. Executed agreement cacheEntry.FileLength. This is the file length of the file. Here,
   a. In the case of a file truncate operation, this is the length to which the file was truncated;
   b. For appends, this is the length of the file before the append starts;

Caching such metadata information in the executed agreement cache and propagating that metadata information to remote executed agreement caches in a synchronous manner enables the underlying data to be written relatively slower, while keeping the state of the replicated folder consistent, at each GSN, across data centers. That is, the state of a replicated folder in DCO 214 at GSN 122 will be the same as the state of the replicated folder at GSN 122 in RDC 216, even if the data replication server 310 in the RDC 216 has since executed the agreement associated with GSN 127 on the replicated data folder and the data replication server 308 in the DCO 214 has not yet caught up to GSN 127 on that replicated folder.

Garbage Collection of Executed Agreement Cache

Garbage collecting the executed agreement cache 309, 311 is a significant aspect of the operational considerations for this system. This rids the executed agreement caches of metadata that is no longer likely to be needed by any of the nodes of the distributed file system. This enables the size of the executed agreement caches to be kept to a reasonable size and further enables the executed agreement caches to be efficiently persisted and rebuilt if such action is needed. One embodiment, therefore, may be configured to garbage collect the executed agreement cache or caches. One implementation of such garbage collection functionality may include each data replication server tracking the lowest GSN for which any request for data (e.g., a data pull request) is active. This information may then be distributed to all data replication servers in the quorum, which quorum may include the group of data replication servers that track the GSNs of a particular replicated folder or selected replicated folders. Thereafter, entries in the executed agreement cache that are below the lowest GSN of any active pull in the quorum may then be garbage collected, as such are no longer needed. According to one embodiment, a configurable limit on the number of entries in the executed agreement cache, may be imposed such as, for example, 10,000, with each entry being associated with a GSN. The executed agreement caches 309, 311 may be configured to store a lesser or a greater number of agreements. An error code, such as ErrorExecutedAgreementCacheGarbageCollected, may be returned by the name mapping service MapFilename API if the map requests a GSN that has been garbage collected. In another embodiment, the data replication servers 308, 310 may be configured to track the lowest active data pull GSN, and may distribute this lowest active data pull GSN to all data replication servers across data centers (again, on a per-replicated folder basis), enabling the garbage collection to be carried out in an on-going manner.

As noted above, the executed agreement cache may be configured as a per replicated folder data structure, such that the data replication servers 308, 310 may each access and maintain a plurality of caches, one for each replicated folder data structure.

According to one embodiment, management or operational commands associated with a replicated data structure, such as changes to selective replication regular expressions, should result in the flushing of the corresponding executed agreement cache, which may then be rebuilt from scratch. Such rebuilding may occur as proposals for namespace-changing operations are approved and implemented.

Name Mapping Service

As noted above, the name mapping service MapFilename API call may be implemented by the data replication servers 308, 310. Uses of this API may include:
1. In the DCO 214, the version bridging server 312 may be configured to call this method when it receives a request to transfer a file. The called name mapping service will then map the name of the file as it was known as of the Create-GSN, which is the GSN associated with the creation of the file. During read of the file, if the read fails, the version bridging server 312 will call the name mapping service again to determine if the file name changed while it was reading the data of the file.
2. In the RDC 216, the data replication server will call the name mapping service to map the filename before starting to write, and also when a write of the pulled data to the local file fails.

According to one embodiment, since the version bridging server 312 is out of process in the first use enumerated above and is in process in the second use above, the name mapping server may be configured to be available both as a Request API and as a local method within the same Java Virtual Machine (JVM). Other implementations are possible.

Input and Output Parameters of the Name Mapping Service MapFilename

The input parameters of the name mapping service may include, according to one implementation:
1. Create-GSN
   a. This is the GSN at which the file or object was created;
2. Path-in
   a. The path-in is the fully qualified path of a file for which the remote data center is requesting data;
   b. The Path-in cannot be a directory;

The output parameters of the name mapping service may include, according to one embodiment:
1. ReturnValue
   a. The ReturnValue may be 'FileExistsUnchanged', meaning that the file is unchanged since its Create-GSN;
   b. The ReturnValue may be 'FileExistsChanged', meaning that the file has changed since it was written (since its Create-GSN);
   c. The ReturnValue may be 'FileDeleted', meaning that the file no longer exists;
   d. An 'ErrorExecuted agreement cacheGarbageCollected' ReturnValue indicates that the file is associated with a Create-GSN that has since been garbage collected; and
   e. A Return value of 'AbortPullRepairComingUp' indicates that the data pull for this file should be aborted, as a repair operation has been scheduled.
2. NewPath
   If the return value is 'FileExistsUnchanged', then the 'NewPath' ReturnValue is the Path of the file as it currently exists in the underlying filesystem and is unchanged since the file's Create-GSN. This output parameter tracks changes to Path-in from Create-GSN until the current GSN of the underlying storage. Both changes to the file name and changes to any parent directory component are tracked and reported in this manner.
3. Length of data that is valid for the file
   a. This output parameter accounts for any possible truncate operations that may have deleted data at the end of the file Operation of Name Mapping Service According to one embodiment, when the name mapping service is called, one or more of the functions and operations detailed below may be carried out.

Upon being called, the name mapping service may check if the Create-GSN associated with the file on which the API is called is less than the lowest GSN stored in executed agreement cache. If so, return 'ErrorExecuted agreement cacheGarbageCollected', as the data replication server will not be able to check the executed agreement cache for changes.

Step through every entry in the executed agreement cache identified by a GSN that is greater than Create-GSN associated with the file against which the name mapping service was called until the greatest (highest, in one embodiment) GSN stored in executed agreement cache is reached. For each such entry, the following may be performed.

If the ExecutedAgreementCacheEntry.Path1 (the path for the file in an entry in the executed agreement cache) matches the input parameter Path-in exactly, steps to be performed depend upon the underlying file operation. If the file operation is rename, then replace the Path-in with the new path 'ExecutedAgreementCacheEntry.Path2' in the executed agreement cache and continue iterating through the remaining entries in the executed agreement cache. If the operation is append or truncate, save ExecutedAgreementCacheEntry.FileLength for returning to the caller and continue iterating through the remaining entries in the Executed agreement cache entries. If the operation is delete, then return FileDeleted immediately and if the operation is Repair, then return AbortPullRepairComingUp immediately.

If ExecutedAgreementCacheEntry.Path1 does not match Path-in, then extract the parent directory of Path-in. For example, if Path-in is /user/jagane/hive-tables/weblogs/file-ABC, then the parent directory of Path-in is /user/jagane/hive-tables/weblogs. If the Executed agreement cacheEntry.Path1 is longer than Path-in parent directory, then the data replication server should continue iterating through the remaining entries (having a greater GSN than the Create-GSN of the file against which the name mapping service was called) in the executed agreement cache.

The following is performed when the ExecutedAgreementCacheEntry.Path1 is determined to be shorter than or equal to Path-in parent directory. If Executed agreement cacheEntry.Path1 equals some prefix substring of Path-in-parentdir, then this indicates that one of the parent dir components of Path-in was operated on. Note that ExecutedAgreementCacheEntry.Path1 must be a directory, and cannot be a file at this point. If the operation is rename, then the prefix on Path-in-parentdir is replaced with ExecutedAgreement CacheEntry.Path2 and the Path-in is recomposed. Continuing with the example developed above, if ExecutedAgreementCacheEntry.Path1 is /user/jagane/hive-tables and if ExecutedAgreement CacheEntry.Path2 is /user/jagane/archived-hive-tables, then replace Path-in with /user/jagane/archived-hive-tables/weblogs/fileABC. Then, continue iterating through the rest of the executed agreement cache entries. If the operation is delete, then the whole subdirectory was deleted and FileDeleted is to be returned immediately. If the operation is Repair, then return AbortPullRepairComingUp. Note that append and truncate are invalid operations at this point since ExecutedAgreementCacheEntry.Path1 must be a directory.

If Executed agreement cacheEntry.Path1 does not equal any prefix substring of Path-in-parentdir (except for the root dir), then continue iterating through the rest of the Executed agreement cache entries. If, at the end of the above loop, no matches were encountered any match for Path-in, then return FileExistsUnchanged. If, at the end of the above loop, some changes have been encountered, either to Path-in, or to the length, then return FileExistsChanged with the new Path and new length as return values Enhancements to Call the Name Mapping Service on the Source Filename at the DCO The data replication server 308 may be configured, as shown and described herein, to maintain an executed agreement cache 309 that is configured to cache details of the filesystem operation performed at specific GSNs. This executed agreement cache 309, according to one embodiment, may be configured to provide a name mapping service for the version bridging server 312 to request a mapping of filename at a specific GSN in the past to the current state of the underlying file system (up to the highest GSN in the executed agreement cache).

Note that a rename/delete agreement may be executed by the data replication server 308 before, during or after the pull request from the data replication server 310 at the DCO arrives at the version bridging server 312 at the DCO 214. Each of these eventualities are discussed hereunder in turn.

Rename/Delete Agreement Executed by Data Replication Server Before Pull Request

Figure 4:
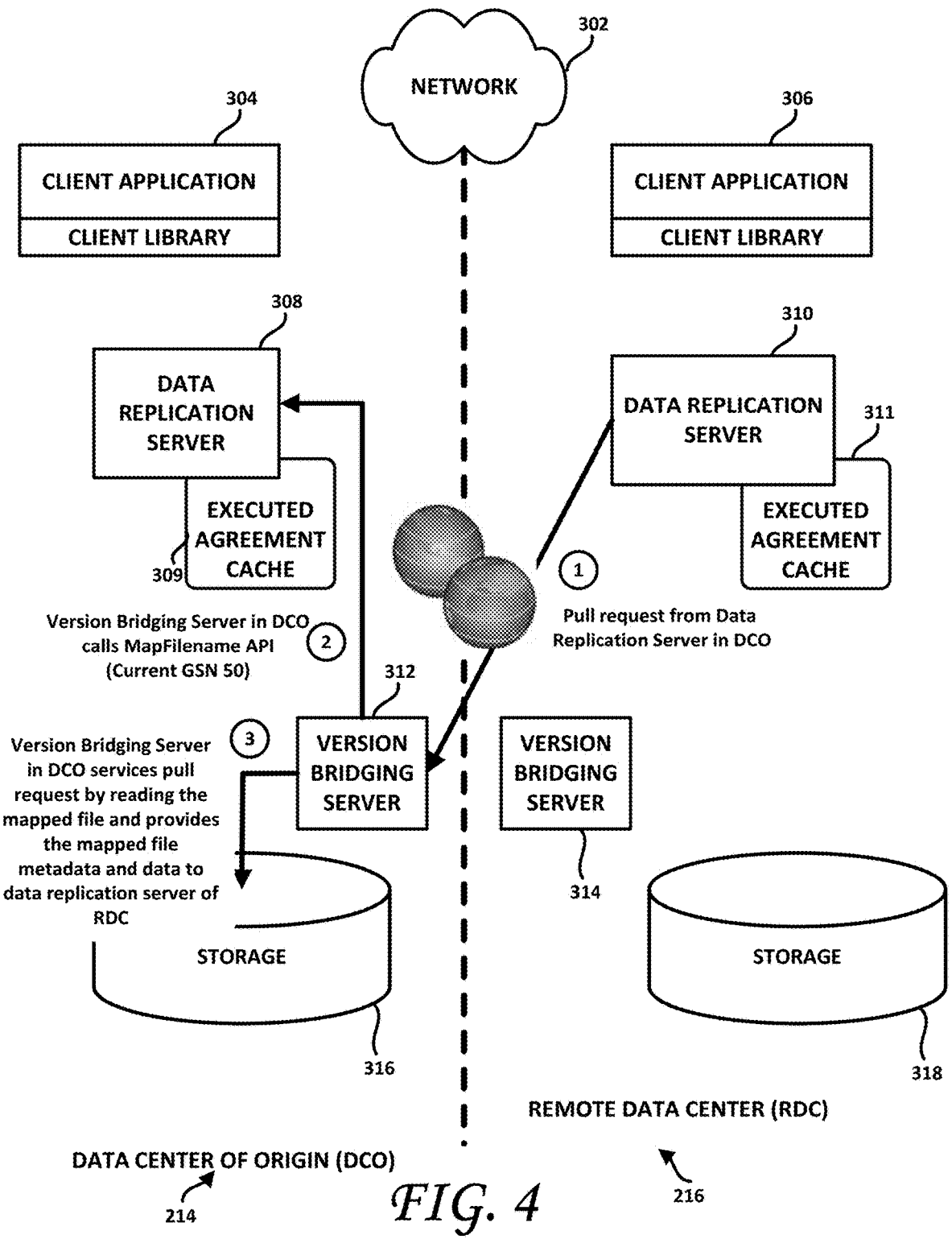
FIG. 4 is a diagram showing data centers coupled to a computer network and aspects of computer-implemented systems and methods, according to embodiments.

FIG. 4 is a block diagram illustrating the case in which the source File or parent path is renamed/deleted before the pull request is received from the RDC. As shown, (1) indicates a pull request issued by the data replication server 310 in the RDC 216 and directed to the version bridging server 312 in the DCO. For example, the data replication server 310, mindful of the possibility that the file name or parent dir of the file whose data it has requested may have changed since its initial writing, may request a name mapping of the file MapFilename /jagane/hive/foo.tmp, at Create-GSN 21. As shown at (2), the version bridging server 312, having received this pull request, calls the name mapping service, which is executed by the data replication server 308 against the executed agreements in the executed agreement cache 309, where the greatest GSN is now 50 (in this example). In response thereto, the name mapping service will iterate through GSNs 21 through 50, searching for possible changes to /jagane/hive/foo.tmp in the intervening time between GSN 21 and GSN 50. The name mapping service, in this example, finds that /jagane/hive/foo.tmp has indeed changed, to /Jagane/hive/foo, at some GSN between GSN 21 and GSN 50. This information is then returned to the version bridging server 312, which then reads /Jagane/hive/foo from the distributed file system 316 (instead of reading /jagane/hive/foo.tmp) and returns the new file name and the data stored therein to the data replication server 310 in the RDC, for asynchronous replication thereof to the remote storage 318.

Figure 5:
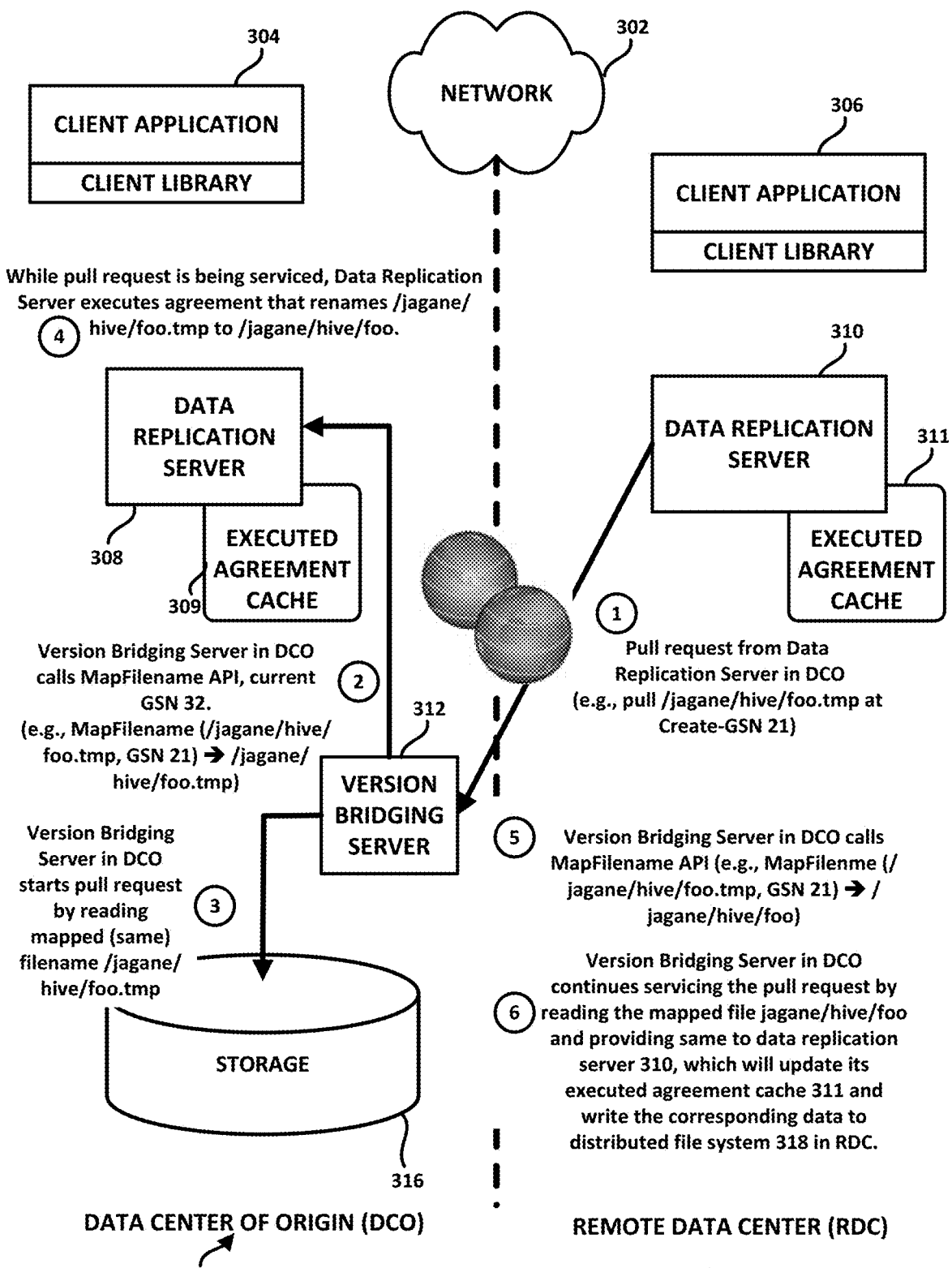
FIG. 5 is a diagram showing data centers coupled to a computer network and aspects of computer-implemented systems and methods, according to embodiments.

Rename/Delete Agreement Executed by Data Replication Server while Pull Request is being Serviced by Version Bridging Server FIG. 5 is a block diagram illustrating the case in which a source File or parent path is renamed/deleted while the remote pull request is being serviced by the version bridging server. At any time while the version bridging server 312 is reading a file from the underlying storage 316 to satisfy a remote pull request, the data replication server may execute another agreement that renames/deletes the file that is the subject of the pull request or the parent path of the file that is the subject of the pull request. In this case, the file pull will fail while in progress because either the file has been renamed or delete or because the path has been changed. According to one embodiment, the version bridging server 312 calls the name mapping service again to map the name/path of the source file. The return value from the name mapping service will indicate whether the file exists by another name or whether it was deleted.

As shown in FIG. 5, the data replication server 310 of the RDC 216 may send, and the version bridging server 312 of the DCO 214 may receive, a pull request for a specific file, as shown at (1). In this example, the pull request is for the file Jagane/hive/foo.tmp, at Create-GSN 21. As shown at (2), the version bridging server 312 at the DCO 214 then calls on the data replication server 308 to execute the name mapping service on the cached entries comprising the metadata of executed agreements in the executed agreement cache 309, which currently stores executed agreements up to GSN 32. The name mapping service returns a value of /Jagane/hive/foo.tmp, indicating that the foo.tmp has not changed (i.e., has not been renamed or deleted) since GSN 21. As shown at (3), the version bridging server 312 in the DCO 214 then begins servicing the pull request by reading the mapped filename which, at this time, is still the same /Jagane/hive/foo.tmp.

As shown at (4), while the pull request is being serviced, the data replication server 308 executes an agreement that renames /Jagane/hive/foo.tmp to /Jagane/hive/foo. This causes the pull request to fail, as the version bridging server 312 can no longer continue to read/Jagane/hive/foo.tmp, as this file has been renamed and /Jagane/hive/foo.tmp no longer exists. Responsive thereto, the version bridging server 312, which had been servicing the request to pull /Jagane/hive/foo.tmp, now calls on the data replication server 308 to re-execute the name mapping service on /Jagane/hive/foo.tmp, GSN 21 on the cached metadata in the executed agreement cache 309, which now stores agreements up to GSN 50 (the renaming of 'foo.tmp' to 'foo' presumably having occurred somewhere between GSN 32 and GSN50). The name mapping service returns with the mapped information /jagane/hive/foo. The version bridging server 312 may now continue servicing the pull request by reading the mapped file /Jagane/hive/foo and providing the same to data replication server 310 in the RDC 216, which will update its own executed agreement cache 311 with the mapped metadata and write the pulled data to the storage 318 in the RDC 216.

Source File or Parent Path is Renamed/Deleted after Pull Request from Remote Site If the pull request has completed and only thereafter is the file or parent path renamed or deleted, there are no actions to be taken, as the executed agreement caches in both the DCO 214 and the RDC 216 will be suitably updated without interfering with any prior or on-going pull requests. All data centers will learn of the rename/deletion through their respective executed agreement caches as these are synchronized.

Data Replication Server at Remote Data Center to Call Name Mapping Service on Target Filename Data replication servers, according to one embodiment, are configured to pull data and write the pulled data to a local file asynchronously. This process may be interrupted by failure if the local file to which the data replication server is writing is renamed or is deleted. This is because the metadata operations, i.e. agreements, continue to be executed while the data is being pulled and written. According to one embodiment, to address this eventuality, the data replication server's name mapping service is used to map the destination file to the newly renamed file. When the remote data replication server 310 executes an agreement that results in a data pull, according to one embodiment, a data replication copy object is created, which data replication copy object is associated with a GSN. This GSN is used for two purposes:

1. The GSN is passed from the remove data replication server to the DCCO 214's version bridging server 309 while pulling data;

2. The GSN is used as a parameter to the name mapping service when the write to the local file fails.

Note that the rename/delete agreement may be executed asynchronously by another thread in the data replication server before, during or after the thread that is performing the data copy:

Case 1: The destination file or parent path is renamed and/or deleted before the data copy thread can start writing the pulled data;

Case 2: The destination file or parent path is renamed and/or deleted while the data copy thread is writing the pulled data; and Case 3: The destination file or parent path is renamed and/or deleted after the data copy thread has finished writing the pulled data. This is of no concern, as the metadata in the executed agreement cache will be updated synchronously and propagated remotely.

As noted above, the data replication copy object, according to one embodiment, is the mechanism by which the asynchronous copy of the data is implemented in the RDC 216. The data replication copy object has its own thread of execution, providing it with the ability to run independently of the metadata modifications. Thus, the data replication copy object implements enables synchronous metadata operations and asynchronous data operations.

According to one embodiment, when the data replication copy object is created, it is given the name of the file for which data is being pulled, as well as the GSN number at which the file was named so. This enables the data replication copy object to do two things:

1. When requesting the data from the DCO 214, the RDC 216's version bridging server provides both the filename from which data is to be pulled, as well as the GSN at which the file was called.

2. When the data replication server of the RDC 216 writes the data pulled from the distributed file system of the DCO 214 to the distributed file system of the RDC 216, according to one embodiment, the name mapping service is called with these two parameters—GSN and Filename, to determine whether the filename changed or not. That is, it is possible that a client application 306 at the RDC 216 has made changes to the data before the pulled data has been written or while the pulled file data is being written. If the filename has changed between the GSN and the current state of the underlying file system, the data replication server 310 will write to the file as it is named in the current state of the underlying file system, using the metadata from the executed agreement cache 311 at the RDC 216. This serves as a final check to ensure that the data that is being written is current, as of the most current GSN stored in the executed agreement cache 311.

As the executed agreement caches in each data center may be implemented in volatile random access memory (Dynamic Random Access Memory (DRAM), for example), it is susceptible to lose its data upon a power failure or upon a failure of the data replication server to which it is coupled. In such an implementation, the upon failure of the data replication server, the newly elected Writer will start with an empty executed agreement cache, and may return an abnormally high number of ErrorExecutedAgreementCacheGarbageCollected. According to one embodiment, however, the executed agreement cache may be persisted in non-volatile storage, enabling it to be at least partially recovered (as of the last time the executed agreement cache was persisted in non-volatile memory) as needed such as in the case, for example, of a writer failure/re-election. The non-volatile storage be part of the storage 316 and/or 318, or in its own, dedicated non-volatile memory.

According to one embodiment, when a filename and/or path changes and goes inconsistent, the whole replicated folder may be marked inconsistent and untrusted. According to another embodiment, the file/folder that went inconsistent may be persisted in non-volatile memory, enabling only the specific subdirectories that are inconsistent to be repaired as detailed herein.

According to another embodiment, the remote data center pulling the data need not necessarily pull the data from the data center of origin. Given the one copy equivalence nature of the data in the distributed file system, the RDC 216 may reach out to another data center (i.e., other than the DCO 214) and request (pull) the same data from that other data center. This may be done for a variety of reasons, including load balancing, bandwidth management, disaster recovery, bringing up a new data center online and the like.

Figure 6:
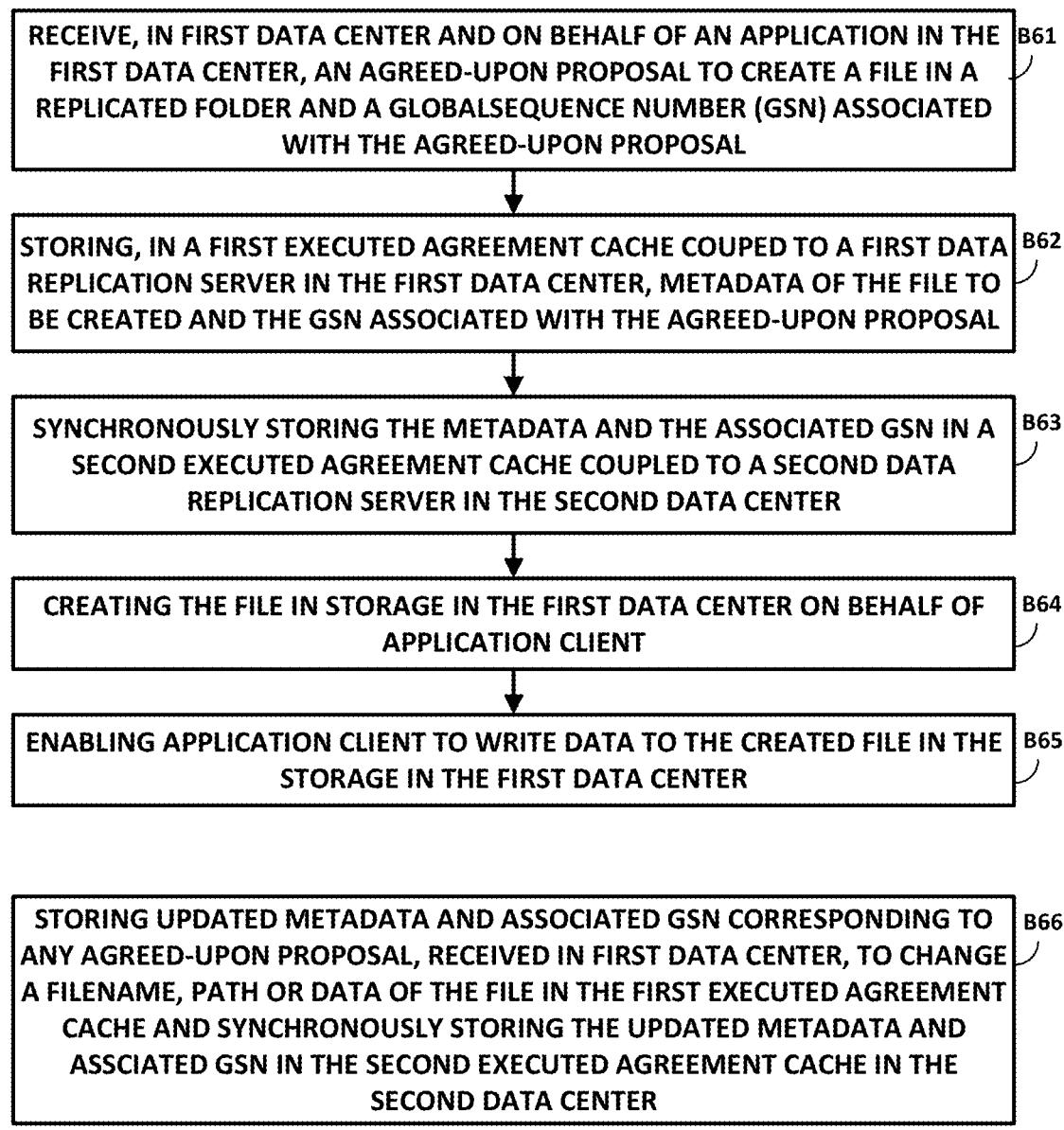
FIG. 6 is a flowchart of a computer-implemented method according to one embodiment.

FIG. 6 is a flowchart of a computer-implemented method of maintaining consistency of a replicated folder in a distributed file system, according to one embodiment. The distributed file system may span, over a computer network, (at least) a first data center and a second data center. The method may comprise, as shown at block B61, receiving, in the first data center and on behalf of an application client in the first data center, an agreed-upon proposal to create a file in the replicated folder and a GSN associated with the agreed-upon proposal. Block B62 calls for storing, in a first executed agreement cache (shown at 309 in FIG. 3, for example) coupled to a first data replication server (shown at 308 in FIG. 3, for example) in the first data center (214 in FIG. 3), metadata of the file to be created and the GSN associated with the agreed-upon proposal. Thereafter, as shown at B63, the metadata and the associated GSN may be synchronously stored in a second executed agreement cache (311 in FIG. 3) coupled to a second data replication server (310 in FIG. 3) in the second data center (shown at reference numeral 216 in FIG. 3). The file may then be created in storage (e.g., in storage 316 in FIG. 3) by the first data replication server in the first data center on behalf of the application client (304 in FIG. 3), as shown at B64. The client application may then write data to the created file in the storage in the first data center, as seen in block B65.

The computer-implemented method may further comprise, as shown at block B66, keeping the executed agreement caches synchronized and up to date as proposals for changes to the file are agreed upon. Indeed, updated metadata and associated GSN corresponding to any agreed-upon proposal, received in the first data center, to change the filename, path or data of the file may be stored in the first executed agreement cache and the updated metadata and associated GSN in the second executed agreement cache may also be synchronously stored in the second data center. Likewise, updated metadata and associated GSN corresponding to any agreed-upon proposal, received in the second data center, to change a filename, path or data of the file may be stored in the second executed agreement cache and the updated metadata and associated GSN may be synchronously stored in the first executed agreement cache.

Figure 7:
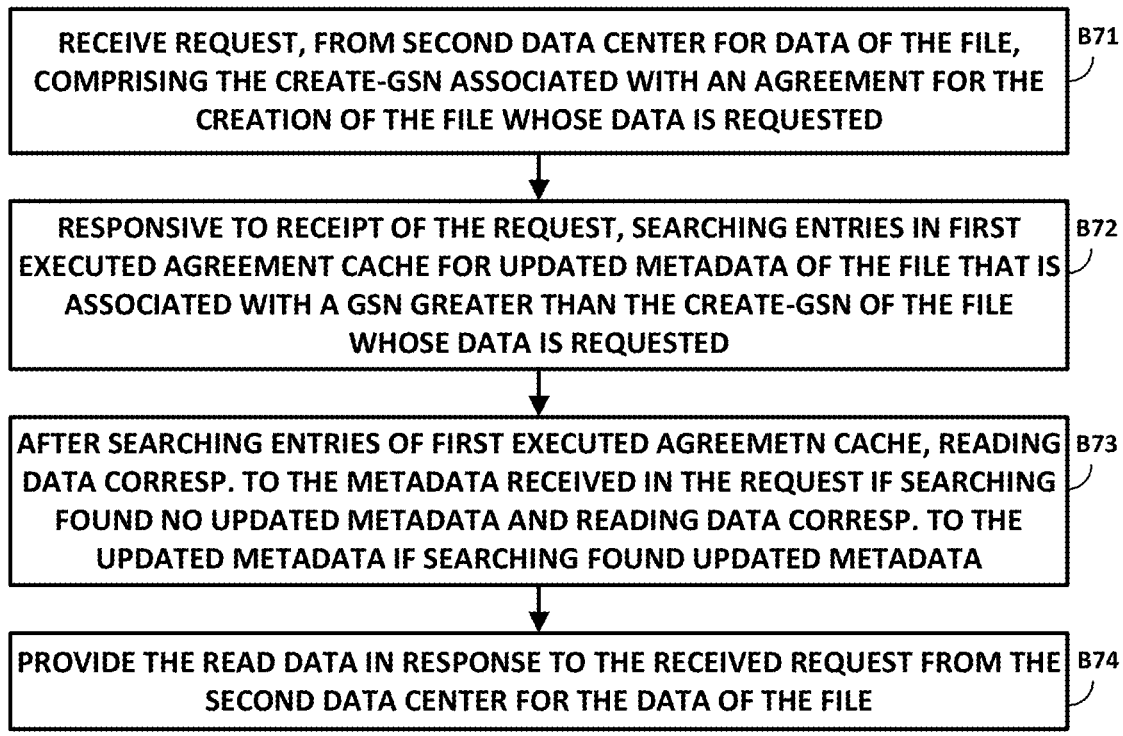
FIG. 7 is a flowchart of a computer-implemented method according to one embodiment.

In FIG. 7, block B71 calls for receiving a request from the second data center for the data of the file (also referred to as a data pull request herein), the request comprising at least a create-GSN associated with an agreement for a creation of the file whose data is requested. Block B72 calls for, responsive to receipt of the request, searching entries in the first executed agreement cache for updated metadata of the file that is associated with a GSN that is greater (e.g., representative of a more recently agreed-upon proposal) than the create-GSN of the file whose data is requested. This will capture any changes to the file made since the pull request was initiated. After searching the entries of the first executed agreement cache, block B73 specifies reading data corresponding to the metadata received in the request if searching found no updated metadata and reading data corresponding to the updated metadata if searching found updated metadata. The read data may then be provided in response to the received request from the second data center for the data of the file, as shown at B74.

Figure 8:
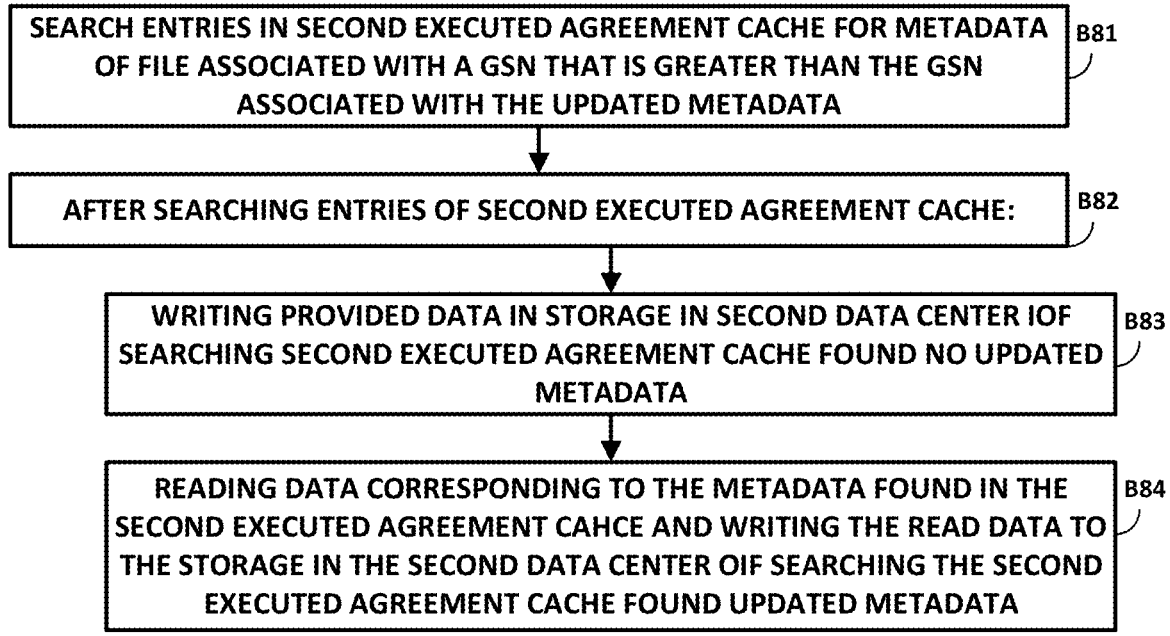
FIG. 8 is a flowchart of a computer-implemented method according to one embodiment.

In FIG. 8, entries in the second executed agreement cache may be searched, as shown at B81, for metadata of the file that is associated with a GSN that is greater than the GSN associated with the updated metadata. After searching the entries of the second executed agreement cache, as shown at B82, the provided data may be written in storage in the second data center if searching the second executed agreement cache found no updated metadata as shown at B83 (no intervening changes to the file were made) and reading data corresponding to the metadata found in the second executed agreement cache and writing the read data to the storage in the second data center if searching the second executed agreement cache found updated metadata, as shown at B84 (intervening changes to the file were made, as evidenced by finding updated metadata in the second executed agreement cache.

According to one embodiment, searching may be carried out by executing a name mapping service API. At least a portion of the first and second executed agreement caches may be journaled (i.e., persisted) in non-volatile memories in the first and second data centers, respectively. If the executed agreement caches need to be rebuilt, the version thereof in non-volatile memory may be retrieved, garbage collected as needed and updated to the GSN of the current agreement. According to another embodiment, the executed agreement caches are not journaled in volatile memory and simply rebuilt from scratch as needed.

Another embodiment of a computer-implemented method may comprise providing a first executed agreement cache in a first data center and providing a second executed agreement cache in a second data center; receiving agreements on proposals to create or make changes to files stored in the first and second data centers; storing metadata of the files referred to by the received agreements in one of the first and second executed agreement caches; maintaining the first and second executed agreement caches synchronous with one another before the files referred to by the received agreements are created or changed; creating or making changes to the file referred to by the received agreements only after the first and second executed agreement caches have been synchronized; and checking at least one of the first and second executed agreement caches for updated metadata whenever requests for data of files stored in the first or second data centers are received in either the first or the second data centers and, responsive to the received requests, providing data corresponding to the updated metadata when updated metadata is found.

A GSN may be associated with each agreement and the GSN of each agreement may be stored along with the metadata in the first and second executed agreement caches. Checking or searching for updated metadata may be carried out by searching entries in the first and/or second executed agreement caches for updated metadata of the file using the GSN associated with the updated metadata. Checking or searching may be performed in the first data center by a first data replication server calling a name mapping service on the entries in the first executed agreement cache and checking or searching may be performed in the second data center by a second data replication server calling a name mapping service on the entries in the second executed agreement cache.

The requests for data may be received in the first data center in a first version bridging server that is configured to cause the first data replication server to call the name mapping service to check the first executed agreement cache for updated metadata corresponding to the requested data. Similarly, the requests for data may be received in the second data center in a second version bridging server that is configured to cause the second data replication server to call the name mapping service to check the second executed agreement cache for updated metadata corresponding to the requested data. Servicing the requests for data may be carried out by the first version bridging server retrieving and providing data corresponding to the updated metadata when updated metadata is found in the first executed agreement cache. Likewise, servicing the requests for data may be carried out by the second version bridging server retrieving and providing data corresponding to the updated metadata when updated metadata is found in the second executed agreement cache. In this manner, all requests issued by the first data replication server in the first data center for data stored in the second data center may be serviced by the second version bridging server in the second data center and wherein all requests issued by the second data replication server in the second data center for data stored in the first data center may be serviced by the first version bridging server in the first data center.

Figure 9:
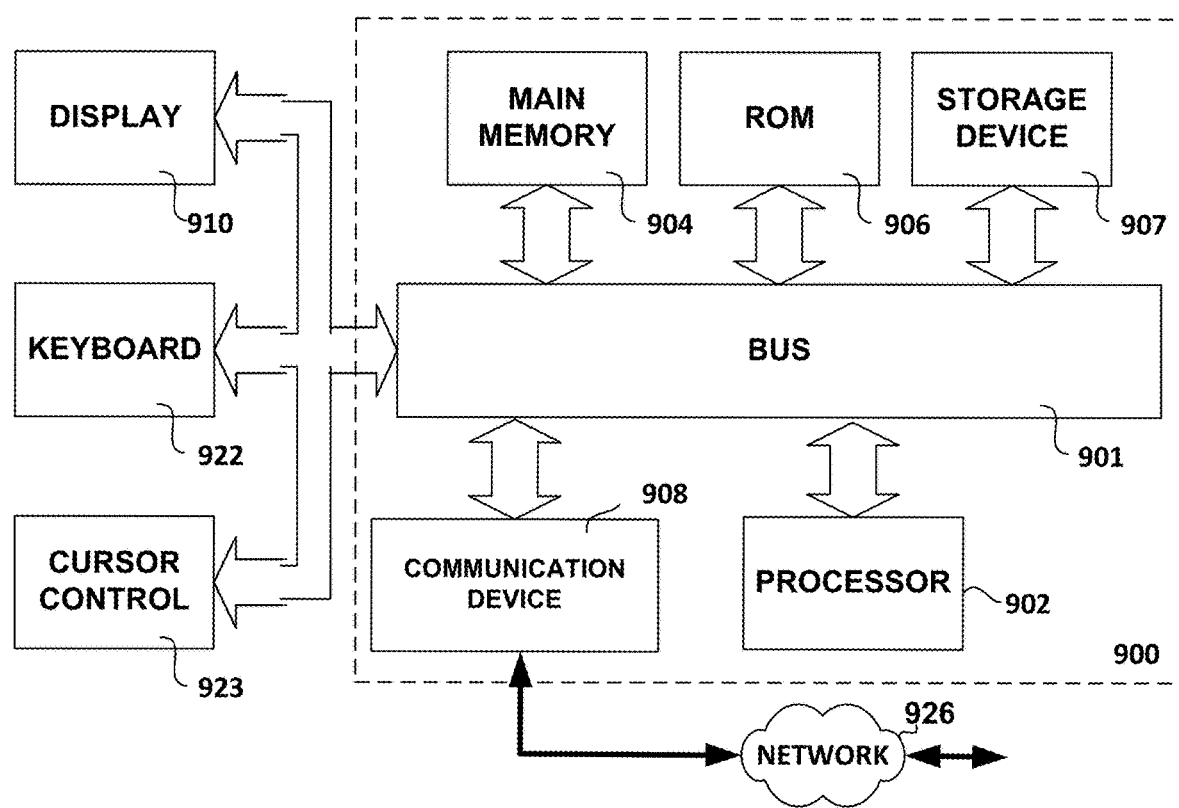
FIG. 9 is a block diagram of a hardware computing device with which aspects of an embodiment may be practiced.

FIG. 9 illustrates a block diagram of a computing device 900 with which embodiments may be implemented. Computer system 900 may include a bus 901 or other communication mechanism for communicating information, and one or more processors 902 coupled with bus 901 for processing information. Computer system 900 further comprises a random access memory (RAM) or other dynamic storage device 904 (referred to as main memory), coupled to bus 901 for storing information and instructions to be executed by processor(s) 902. Main memory 904 also may be used for storing temporary variables or other intermediate information during execution of instructions by processor 902. Computing device 900 also may include a read only memory (ROM) and/or other static storage device 906 coupled to bus 901 for storing static information and instructions for processor 902. A non-transitory, tangible data storage device 907 such as, for example, a magnetic disk or Flash storage, may be coupled to bus 901 for storing information and instructions. The non-transitory, tangible data storage device may be configured to store computer-readable instructions, which, when executed by processor 902, cause the computing system to carry out one or more of the embodiments described and shown herein. The computing device 900 may also be coupled via the bus 901 to a display device 910 for displaying information to a computer user. An alphanumeric input device 922, including alphanumeric and other keys, may be coupled to bus 901 for communicating information and command selections to processor(s) 902. Another type of user input device is cursor control 923, such as a mouse, a trackball, or cursor direction keys for communicating direction information and command selections to processor 902 and for controlling cursor movement on display 921. The computing device 900 may be coupled, via a communication device (e.g., modem, NIC) to a network 926 and to one or more nodes of a distributed computing system.

Embodiments are related to the use of computing device and/or to a plurality of such computing devices to maintain consistency of metadata and data across data centers over a computer network. According to one embodiment, the methods and systems described herein may be provided by one or more computing devices 900 in response to processor(s) 902 executing sequences of instructions contained in memory 904. Such instructions may be read into memory 904 from another computer-readable medium, such as data storage device 907. Execution of the sequences of instructions contained in memory 904 causes processor(s) 902 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computing device may implement the functionality described herein. The computing device may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

The various features and processes described above may be used independently of one another, or may be combined in various ways. While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method of maintaining consistency of a replicated folder in a distributed file system spanning, over a computer network, at least a first data center and a second data center, the method comprising:
   receiving in the first data center, on behalf of an application client in the first data center, an agreed-upon proposal to create a file in the replicated folder and a global sequence number (GSN) associated with the agreed-upon proposal to create the file;
   storing, in a first executed agreement cache coupled to a first data replication server in the first data center, metadata of the file to be created and the GSN associated with the agreed-upon proposal to create the file;
   synchronously storing the metadata of the file to be created and the associated GSN in a second executed agreement cache coupled to a second data replication server in the second data center;
   creating the file in storage in the first data center on behalf of the application client; and
   enabling the application client to write data to the created file in the storage in the first data center.

2. The computer-implemented method of claim 1, further comprising:
   storing updated metadata and associated GSN corresponding to any agreed-upon proposal, received in the first data center, to change a filename, path or data of the file in the first executed agreement cache and synchronously storing the updated metadata and associated GSN in the second executed agreement cache in the second data center.

3. The computer-implemented method of claim 1, further comprising:
   storing updated metadata and associated GSN corresponding to any agreed-upon proposal, received in the second data center, to change a filename, path or data of the file in the second executed agreement cache and synchronously storing the updated metadata and associated GSN in the first executed agreement cache.

4. The computer-implemented method of claim 1, further comprising:
   receiving a request from the second data center for the data of the file, the request comprising at least a create-GSN associated with an agreement for a creation of the file whose data is requested;
   responsive to receipt of the request, searching entries in the first executed agreement cache for updated metadata of the file that is associated with a GSN that is greater than the create-GSN of the file whose data is requested;
   after searching the entries of the first executed agreement cache, reading data corresponding to the metadata received in the request if searching found no updated metadata and reading data corresponding to the updated metadata if searching found updated metadata; and
   providing the read data in response to the received request from the second data center for the data of the file.

5. The computer-implemented method of claim 4, further comprising:
    searching entries in the second executed agreement cache for metadata of the file that is associated with a GSN that is greater than the GSN associated with the updated metadata; and
    after searching the entries of the second executed agreement cache:
        writing the provided data in storage in the second data center if searching the second executed agreement cache found no updated metadata; and
        reading data corresponding to the metadata found in the second executed agreement cache and writing the read data to the storage in the second data center if searching the second executed agreement cache found updated metadata.

6. The computer-implemented method of claim 2, wherein searching is carried out by executing a name mapping service application program interface (API).

7. The computer-implemented method of claim 1, further comprising the request from the second data center for the data of the file being received by a first version bridging server in the first data center, the first version bridging server being separate and distinct from the first data replication server.

8. The computer-implemented method of claim 1, further comprising:
    periodically persisting at least a portion of the first executed agreement cache in non-volatile memory in the first data center; and
    periodically persisting at least a portion of the second executed agreement cache in non-volatile memory in the second data center.

9. A computer-implemented method, comprising:
    providing a first executed agreement cache in a first data center and providing a second executed agreement cache in a second data center;
    receiving agreements on proposals to create or make changes to files stored in the first and second data centers;
    storing metadata of the files referred to by the received agreements in one of the first and second executed agreement caches;
    maintaining the first and second executed agreement caches synchronous with one another before the files referred to by the received agreements are created or changed;
    creating or making changes to the file referred to by the received agreements only after the first and second executed agreement caches have been synchronized; and
    searching at least one of the first and second executed agreement caches for updated metadata whenever requests for data of files stored in the first or second data centers are received in the first or the second data centers and, responsive to the received requests, providing data corresponding to the updated metadata when updated metadata is found in the at least one of the first and second executed agreement caches.

10. The computer-implemented method of claim 9, further comprising associating a global sequence number (GSN) with each agreement and storing the GSN of each agreement along with the metadata in the first and second executed agreement caches, and wherein
    checking for updated metadata is carried out by searching entries in the at least one of the first and second executed agreement caches for updated metadata of the file using the GSN associated with the updated metadata.

11. The computer-implemented method of claim 9, wherein checking is performed in the first data center by a first data replication server calling a name mapping service on the entries in the first executed agreement cache and wherein checking is performed in the second data center by a second data replication server calling a name mapping service on the entries in the second executed agreement cache.

12. The computer-implemented method of claim 11, further comprising:
    receiving the requests for data in the first data center in a first version bridging server that is configured to cause the first data replication server to call the name mapping service to check the first executed agreement cache for updated metadata corresponding to the requested data; and
    receiving the requests for data in the second data center in a second version bridging server that is configured to cause the second data replication server to call the name mapping service to check the second executed agreement cache for updated metadata corresponding to the requested data.

13. The computer-implemented method of claim 12, further comprising:
    servicing the requests for data by the first version bridging server retrieving and providing data corresponding to the updated metadata when updated metadata is found in the first executed agreement cache; and
    servicing the requests for data by the second version bridging server retrieving and providing data corresponding to the updated metadata when updated metadata is found in the second executed agreement cache.

14. The computer-implemented method of claim 12, wherein all requests issued by the first data replication server in the first data center for data stored in the second data center are serviced by the second version bridging server in the second data center and wherein all requests issued by the second data replication server in the second data center for data stored in the first data center are serviced by the first version bridging server in the first data center.

15. A computer-implemented system spanning first and second data centers coupled to a computer network, the system comprising:
    in the first data center: a first storage; a first data replication server; a first cache configured to store metadata; and a first version bridging server; and
    in the second data center: a second storage; a second data replication server; a second cache configured to store metadata; and a second version bridging server;
    wherein the first and second caches are configured to store metadata of data stored in the first and second storages, respectively, and to be maintained consistent with one another;
    wherein requests for data stored in the first storage issued from the second data center are serviced by the first version bridging server, which is configured to cause the first replication server to search the first cache for updated metadata of the requested data, the first version bridging server being further configured to provide the second data center with data corresponding to the updated metadata when updated metadata of the requested data is found in the first cache; and
    wherein request for data stored in the second storage issued from the first data center are serviced by the second version bridging server, which is configured to cause the second replication server to search the second cache for updated metadata, the second version bridging server being further configured to provide the first data center with data corresponding to the updated metadata when updated metadata of the requested data is found in the second cache.

16. The computer-implemented system of claim 15, wherein each entry in the first and in the second caches is configured to store a global sequence number (GSN) and wherein each of the first and second data replication servers are configured to search the first and second caches, respectively, for updated metadata of the requested data using the GSN.

17. The computer-implemented system of claim 15, wherein the first and second data replication servers are configured to search the first and second caches, respectively, by each executing a name mapping service on the entries in the first and second caches, respectively.

18. The computer-implemented method of claim 12, wherein all requests issued by the first data replication server in the first data center for data stored in the second data center are serviced by the second version bridging server in the second data center and wherein all requests issued by the second data replication server in the second data center for data stored in the first data center are serviced by the first version bridging server in the first data center.

\* \* \* \* \*